US012216433B2

(12) United States Patent
Morita et al.

(10) Patent No.: US 12,216,433 B2
(45) Date of Patent: Feb. 4, 2025

(54) ELECTRONIC TIME PIECE

(71) Applicant: CITIZEN WATCH CO., LTD., Tokyo (JP)

(72) Inventors: Shoichiro Morita, Kawagoe (JP); Akira Kato, Tokorozawa (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 711 days.

(21) Appl. No.: 17/458,583

(22) Filed: Aug. 27, 2021

(65) Prior Publication Data

US 2022/0066392 A1 Mar. 3, 2022

(30) Foreign Application Priority Data

Aug. 28, 2020 (JP) ................................. 2020-144787

(51) Int. Cl.

| | |
|---|---|
| ***G04B 19/06*** | (2006.01) |
| ***G04G 19/00*** | (2006.01) |
| ***G04G 21/00*** | (2010.01) |

(52) U.S. Cl.

CPC ............. *G04B 19/06* (2013.01); *G04G 19/00* (2013.01); *G04G 21/00* (2013.01)

(58) Field of Classification Search

CPC ........ G04B 19/06; G04G 19/00; G04G 21/00; G04G 21/08

USPC .......................................................... 368/232

See application file for complete search history.

(56) References Cited

U.S. PATENT DOCUMENTS

| | | | | |
|---|---|---|---|---|
| 3,961,472 A * | 6/1976 | Riehl | G04G 9/0082 | 368/64 |
| 5,088,070 A * | 2/1992 | Shiff | G04C 3/001 | 368/69 |
| 2006/0171258 A1 | 8/2006 | Nirasawa | | |

FOREIGN PATENT DOCUMENTS

| | | |
|---|---|---|
| CN | 1677595 A | 10/2005 |
| CN | 101097437 A | 1/2008 |
| CN | 101192047 A | 6/2008 |
| CN | 203720548 U | 7/2014 |
| JP | S50-44177 U | 5/1975 |
| JP | S5044177 * | 5/1975 |
| JP | S58-38884 A | 3/1983 |
| JP | H03-10292 U | 1/1991 |
| JP | H0886890 A * | 9/1994 |
| JP | H09251084 A | 9/1997 |

(Continued)

OTHER PUBLICATIONS

Office Action of Mar. 5, 2024, for corresponding JP Patent Application No. 2020-144787 with English translation, pp. 1-14.

(Continued)

*Primary Examiner* — Edwin A. Leon
*Assistant Examiner* — Kevin Andrew Johnston
(74) *Attorney, Agent, or Firm* — HEA Law PLLC

(57) ABSTRACT

An electronic time piece includes a dial, a sub dial provided to the dial, a control circuit that controls operation of a function hand disposed on the sub dial, a plurality of terminal portions, a wire that electrically connects the plurality of terminal portions with the control circuit, a push button that receives operation by a user and switches an electrical connection state between one terminal portion of the plurality of terminal portions and the control circuit. The one terminal portion of the plurality of terminal portions and other terminal portion are electrically connected to the control circuit by a common wire.

16 Claims, 32 Drawing Sheets

(56) References Cited

FOREIGN PATENT DOCUMENTS

| | | | | |
|---|---|---|---|---|
| JP | 2000-056045 | A | | 2/2000 |
| JP | 2000081490 | A | * | 3/2000 |
| JP | 2000-292570 | A | | 10/2000 |
| JP | 2006-242940 | A | | 9/2006 |
| JP | 2007078504 | A | * | 3/2007 |
| JP | 2017150968 | A | * | 8/2017 |

OTHER PUBLICATIONS

Office Action of Oct. 17, 2023, for corresponding JP Patent Application No. 2020-144787 with its partial translation, pp. 1-12.
Office Action of Apr. 2, 2024, for corresponding CN Patent Application No. 202110996064.1 with English translation, pp. 1-19.
Office Action of Sep. 26, 2024, for CN Patent Application No. 202110996064.1 with English translation, pp. 1-22.

* cited by examiner

FIG.9C

| | | |
|---|---|---|
| TERMINAL PORTION A | FIRST INPUT UNIT 30a | FUNCTION 1 |
| TERMINAL PORTION B | SECOND INPUT UNIT 30b | FUNCTION 2 |
| TERMINAL PORTION C | THIRD INPUT UNIT 30c | FUNCTION 3 |

FIG.10C

| | | |
|---|---|---|
| TERMINAL PORTION B | SECOND INPUT UNIT 30b | FUNCTION 1 |
| TERMINAL PORTION C | THIRD INPUT UNIT 30c | FUNCTION 2 |
| TERMINAL PORTION D | FIRST INPUT UNIT 30a | FUNCTION 3 |

FIG.11C

| | | |
|---|---|---|
| TERMINAL PORTION C | THIRD INPUT UNIT 30c | FUNCTION 1 |
| TERMINAL PORTION D | FIRST INPUT UNIT 30a | FUNCTION 2 |
| TERMINAL PORTION E | SECOND INPUT UNIT 30b | FUNCTION 3 |

FIG.12C

| | | |
|---|---|---|
| TERMINAL PORTION D | FIRST INPUT UNIT 30a | FUNCTION 1 |
| TERMINAL PORTION E | SECOND INPUT UNIT 30b | FUNCTION 2 |
| TERMINAL PORTION F | THIRD INPUT UNIT 30c | FUNCTION 3 |

FIG.13C

| | | |
|---|---|---|
| TERMINAL PORTION E | SECOND INPUT UNIT 30b | FUNCTION 1 |
| TERMINAL PORTION F | THIRD INPUT UNIT 30c | FUNCTION 2 |
| TERMINAL PORTION G | FIRST INPUT UNIT 30a | FUNCTION 3 |

ELECTRONIC TIME PIECE

CROSS-REFERENCE TO RELATED APPLICATION

The present application claims priority from Japanese application 2020-144787 filed on Aug. 28, 2020, the content of which is hereby incorporated by reference into this application.

BACKGROUND OF THE INVENTION

1. Field of the Invention

The present invention relates to an electronic time piece.

2. Description of the Related Art

For example, JP2007-078504A discloses a wristwatch having a display unit provided on a dial and a plurality of buttons. The wristwatch of JP2007-078504A employs a configuration that does not require to manufacture the housing every time the layout of display unit is changed.

The wristwatch of JP2007-078504A is required to provide wires for transmitting signals when the button is pressed to the control unit according to the number of terminal portions. In such a configuration, the number of wires is increased, and the circuit tends to be large.

One or more embodiments of the present invention have been conceived in view of the above, and an object thereof is to provide an electronic time piece capable of providing variations in external appearance by using common modules without increasing the size of circuits.

SUMMARY OF THE INVENTION

The invention disclosed in the present application to achieve the above-mentioned object has various aspects, and the representative aspects are outlined as follows.

(1) An electronic time piece includes a dial, a function display unit provided on the dial, a control circuit that controls operation of the function display unit, a plurality of terminal portions, a plurality of wires that electrically connect the plurality of terminal portions with the control circuit, and an operating member that receives operation by a user and switches a state of electrical connection between one terminal portion of the plurality of terminal portions and the control circuit. The one terminal portion and other terminal portion of the plurality of terminal portions are electrically connected with the control circuit through a common wire among plurality of wires.

(2) In (1), the electronic time piece includes a switch member for conducting between the control circuit and the one terminal portion in response to operation of the operating member by the user, and a disposing portion for disposing the switch member in accordance with a position of the terminal portion.

(3) In (2), the disposing portion is provided according to a number of the plurality of terminal portions.

(4) In (2), plurality of wires include a first wire that electrically connects the control circuit with the terminal portion that is disposed to correspond to the switch member, and a second wire that electrically connects the control circuit with the terminal portion that is not disposed to correspond to the switch member. The first wire and the second wire share a common part.

(5) In (2), the disposing portion is a mounting portion on which the switch member is mounted.

(6) In (2), the electronic time piece includes a movement on which at least the control circuit, the plurality of terminal portions, and the wire are mounted, and an outer case that houses the movement. At least one of the movement or the outer case includes a positioning portion that positions the movement with respect to the outer case so as to determine a position of the disposing portion.

(7) In (6), the positioning portion is provided according to a number of the disposing portion.

(8) In (6), the plurality of disposing portions are provided at intervals corresponding to a disposing angle of the movement to the outer case.

(9) In (6), the switch member is a flat spring, and the electronic time piece includes a switch spring that includes the flat spring and the disposing portion that is assembled with a substrate contained in the movement so as to dispose the flat spring according to a position of the terminal portion.

(10) In (2), the operating member includes at least a first operating member and a second operating member, the switch member includes a first switch member corresponding to the first operating member and a second switch member corresponding to the second operating member. The control circuit includes a first input unit in which a switch signal is input in response to operation of the first operating member by the user, a second input unit in which a switch signal is input in response to operation of the second operating member by the user, and a function setting unit that sets functions to be executed in response to the switch signals entered in the first input unit and the second input unit.

(11) In (10), the first switch member and the second switch member are disposed so as to correspond to adjacent terminal portions of the plurality of terminal portions.

(12) In (11), the wire that electrically connects the control circuit with the terminal portion that is disposed so as to correspond to the first switch member and the wire that electrically connects the control circuit with the terminal portion that is disposed so as to correspond to the second switch member, are not common.

(13) In (2), the electronic time piece includes an hour hand rotating around a hand shaft, and a vibration motor or a battery that is disposed so as not to overlap an area between the disposing portion and the hand shaft in a plan view.

(14) In (1), the function display unit includes at least a function hand.

(15) In (1), the function display unit includes a display screen for a digital display.

(16) In (1), the electronic time piece includes a hand shaft to which a time hand is attached, and the function display unit is disposed such that a center of the function display unit does not overlap the hand shaft.

BRIEF DESCRIPTION OF THE DRAWINGS

FIG. 9C is a diagram showing functions assigned to terminal portions for inputting a switching signal to input units and assigned to the input units in the electronic time piece of the first embodiment;

FIG. 10C is a diagram showing functions assigned to terminal portions for inputting a switching signal to input units and assigned to the input units in the electronic time piece of the second embodiment;

FIG. 11C is a diagram showing functions assigned to terminal portions for inputting a switching signal to input units and assigned to the input units in the electronic time piece of the second embodiment;

FIG. 12C is a diagram showing functions assigned to terminal portions for inputting a switching signal to input units and assigned to the input units in the electronic time piece of the fourth embodiment;

FIG. 13C is a diagram showing functions assigned to terminal portions for inputting a switching signal to input units and assigned to the input units in the electronic time piece of the fifth embodiment;

DETAILED DESCRIPTION OF THE INVENTION

Hereinafter, embodiment of the present invention (hereinafter, referred to as "embodiment") will be described in detail with reference to the drawings.

Figure 1:
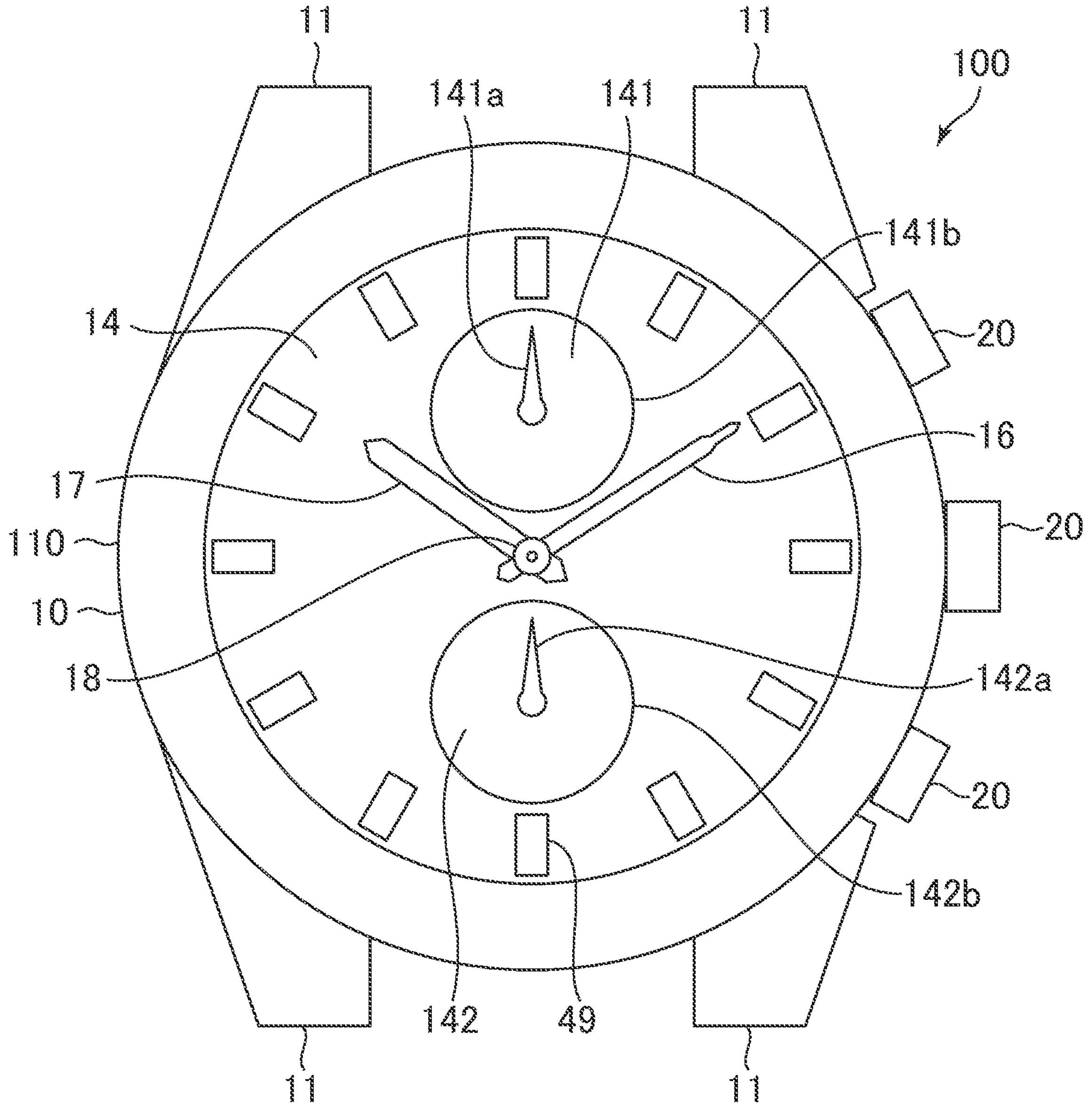
FIG. 1 is a plan view of an electronic time piece according to the present embodiment.
Figure 2:
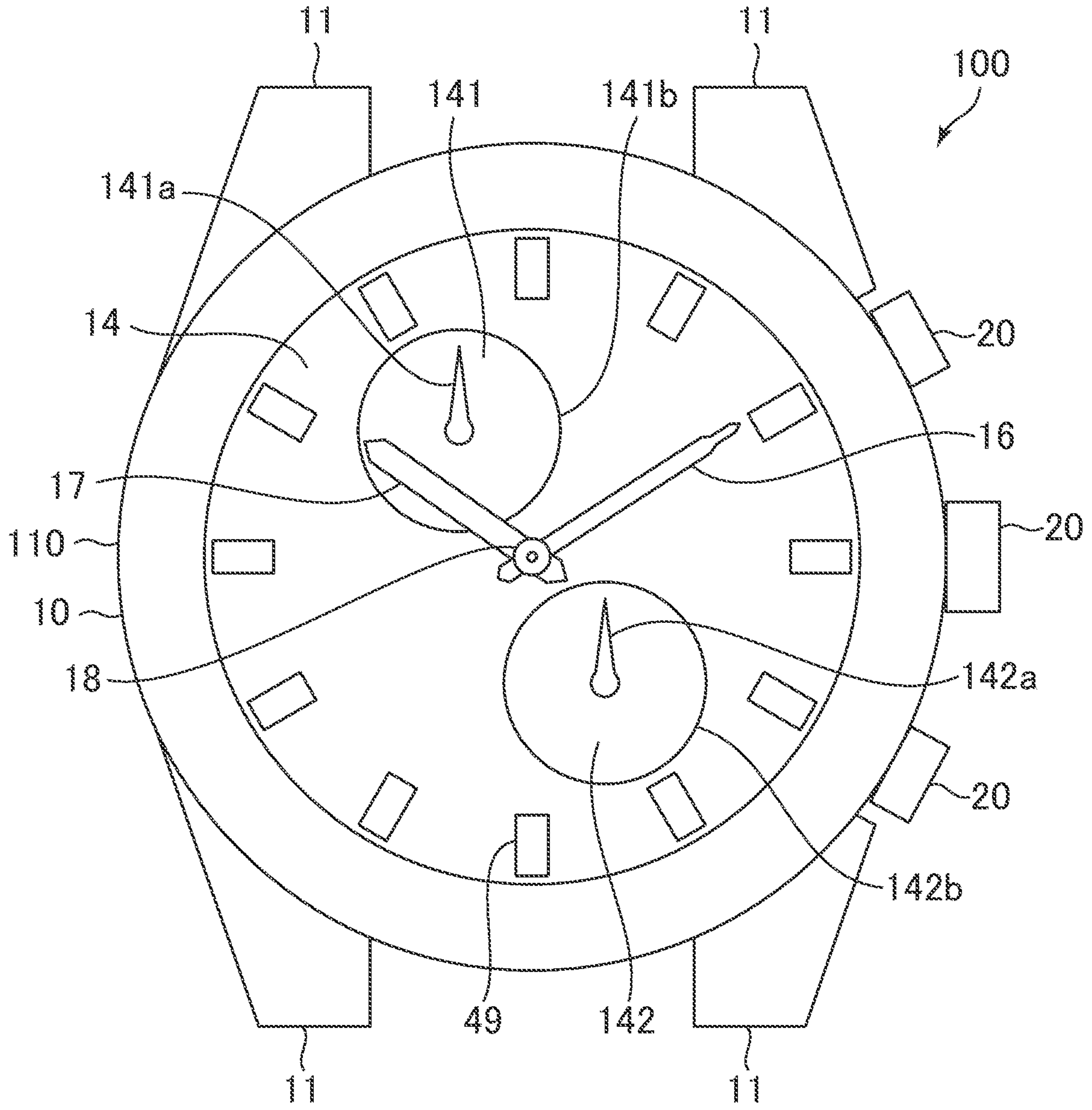
FIG. 2 is a plan view of an electronic time piece according to the present embodiment.

Referring to FIGS. 1 and 2, the overall configuration of an electronic time piece 100 according to the present embodiment will be described. FIGS. 1 and 2 are plan views showing an electronic time piece according to the present embodiment.

FIG. 1 shows an example in which a sub dial 141 on which a function hand 141*a* as small hand is disposed is provided adjacent to an hour mark indicating 12 o'clock, and a sub dial 142 on which a function hand 142*a* as small hand is disposed is provided adjacent to an hour mark indicating 6 o'clock. FIG. 2 shows an example in which a sub dial 141 on which a function hand 141*a* is disposed is provided adjacent to an hour mark indicating 11 o'clock, and a sub dial 142 on which a function hand 142*a* is disposed is provided adjacent to an hour mark indicating 5 o'clock. The electronic time piece 100 shown in FIG. 1 and the electronic time piece 100 shown in FIG. 2 have the same layout of push buttons 20.

In the present embodiment, a contained movement 1 is common, and as shown in FIGS. 1 and 2, the layout variations of the sub dials 141 and 142, which are function display units, are available. That is, a configuration is adopted in which electronic time pieces 100 having different appearances can be manufactured by using one type of movement 1. Referring to FIGS. 1 and 2, two types of variations are indicated, although five types of variations are available in the present embodiment as described later.

The electronic time piece 100 includes an outer case 10 formed of a case body 110 and a back cover (not shown), a dial 14 housed in the outer case 10, and a minute hand 16 and an hour hand 17, which are time hands indicating the time by rotating around a hand shaft 18.

The dial 14 includes hour marks 49 at predetermined positions. Band fixing portions 11 for fixing the band are extended from the side surfaces of the outer case 10 at the 12 o'clock and 6 o'clock sides.

The electronic time piece 100 includes a windshield (not shown) formed of a transparent material such as glass so as to cover the dial 14. The windshield is attached to the case body 110 of the outer case 10. On the opposite side of the windshield, the back cover is attached to the case body 110.

In this embodiment, the side on which the windshield is provided is referred to as a front side, and the side on which the back cover is provided is referred to as a back side. That is, FIGS. 1 and 2 show the electronic time piece 100 viewed from the front side.

The dial plate 14 includes the sub dial 141. The sub dial 141 has a circular edge 141*b* in a plan view, and the function hand 141*a* and scales (not shown) are disposed inside the edge 141*b*. The edge 141*b* may be, for example, an edge of an opening formed in the dial 14. The function hand 141*a* and the scales may display various functions of the electronic time piece 100, such as a day of the week, time zones, daylight saving time or not, reception conditions of radio waves, and remaining amounts of batteries. Alternatively, the function hand 141*a* and the scales may display the time such as a second.

Further, the dial plate 14 includes the sub dial 142. The sub dial 142 has a circular edge 142*b* in a plan view, and the function hand 142*a* and scales (not shown) are disposed inside the edge 142*b*. The edge 142*b* may be, for example, an edge of an opening formed in the dial 14. The function hand 142*a* as small hand and the scales may display functions different from the function hand 141*a* as small hand and the scales included in the sub dial 141.

FIGS. 1 and 2 show examples in which two sub dials being the function display units are provided, although the present invention is not limited thereto. For example, there may be one sub dial, or three or more sub dials. Further, the function display unit is not limited to have a circular planar shape, but may have a rectangular shape.

The sub dial being the function display unit may be disposed so that at least its center does not overlap with the hand shaft 18 (the center of the dial 14). For example, as shown in FIGS. 1 and 2, the entire sub dial, which is the function display unit, may be disposed in the area between the hand shaft (the center of the dial 14) and the outer edge of the dial 14.

In the present embodiment, the analogue display is performed using the function hands included in the sub dial being the function display unit, although the present invention is not limited to this, and the function display unit may be a digital display. That is, the function display unit may have a display screen for a digital display. The display screen may be, for example, a liquid crystal display or an organic EL (Electro Luminescence) display.

A push button 20, which is a member for a user to perform various operations, is disposed on the side surface of the outer case 10 on the 3 o'clock side. The push button 20 receives an operation of the user, and switches the electrical connection state between a terminal portion and a control circuit 30 to be described later. In this embodiment, three push buttons 20 are provided. The electronic time piece 100 of this embodiment does not have a crown.

The designs of the electronic time piece 100 shown in FIGS. 1 and 2 are examples. Other than as shown herein, for example, the outer shape of the outer case 10 may have a square shape such as an octagonal shape or a so-called tonneau shape instead of a circular shape. At least, the planar shape of the dial 14 including the sub dial being the function display unit may have the same outer shape when rotated in the circumferential direction. This embodiment shows an example in which two time hands of the minute hand 16 and the hour hand 17 are provided, but the present invention is not limited to this, and a second hand may be further provided.

In the present embodiment, a wristwatch is described as an example of the electronic time piece 100, although the present invention is not limited to this and may be a pocket watch, for example.

Figure 3:
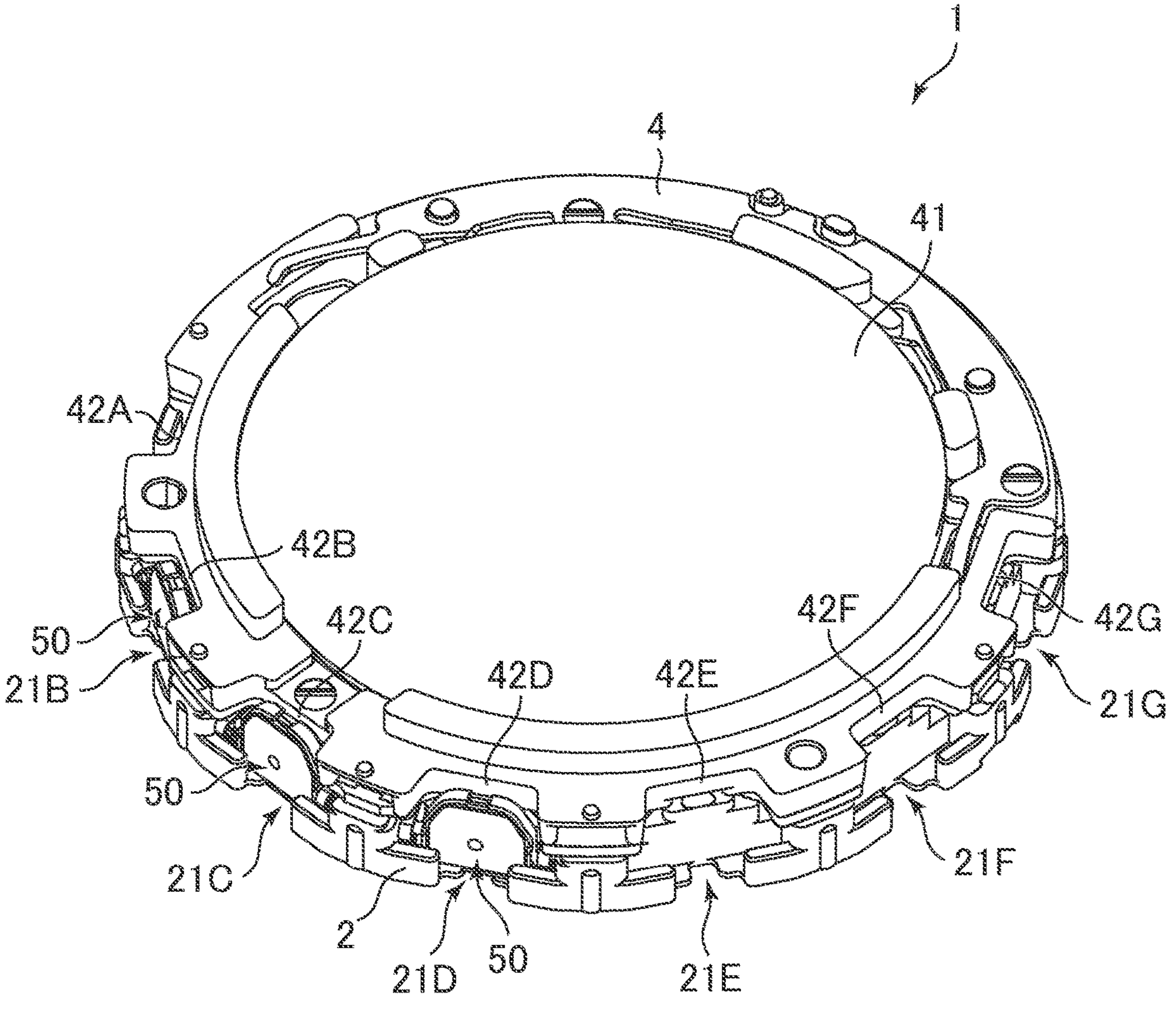
FIG. 3 is a perspective view of a movement of the present embodiment.
Figure 4:
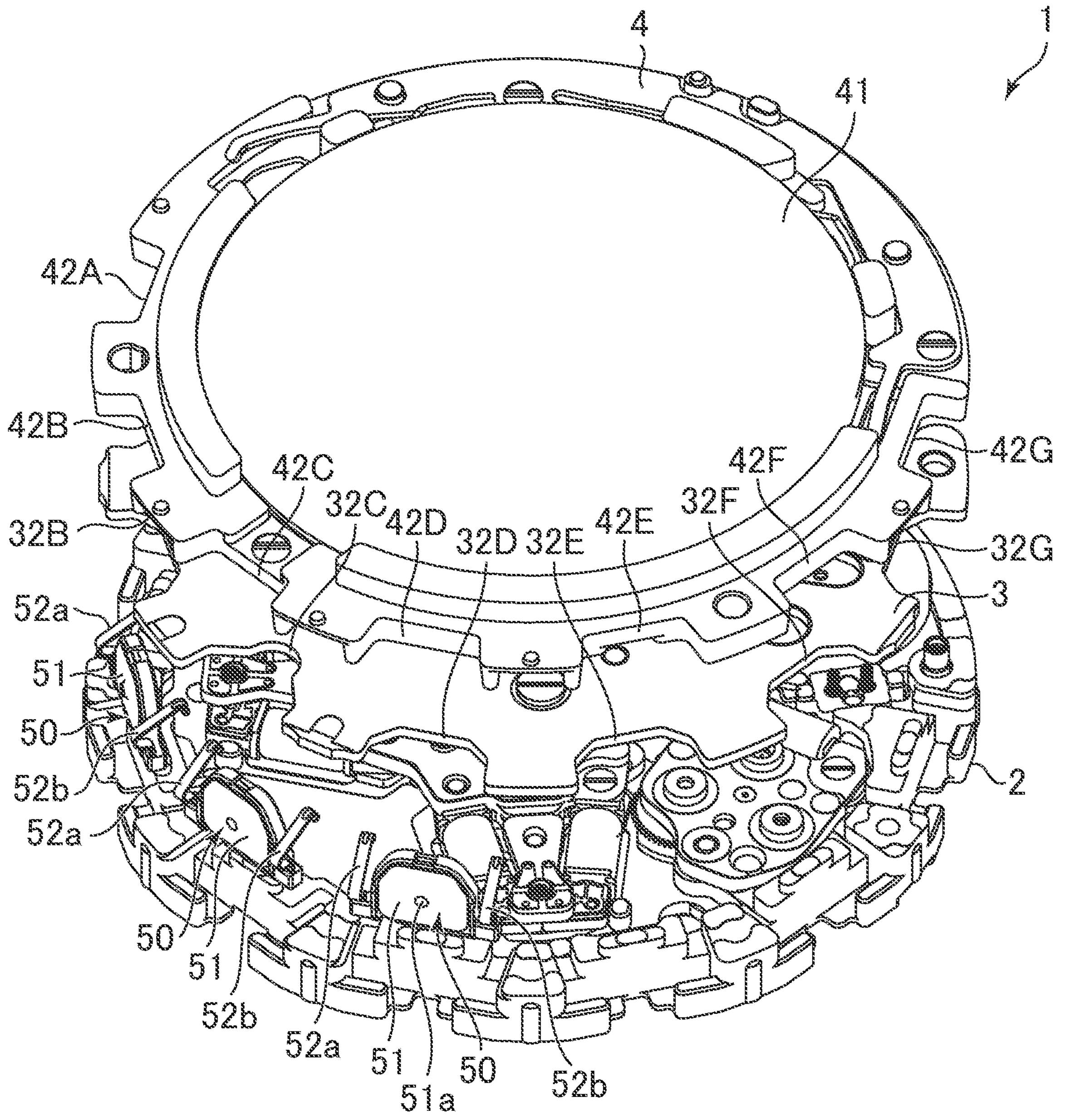
FIG. 4 is an exploded perspective view of the movement shown in FIG. 3.
Figure 5:
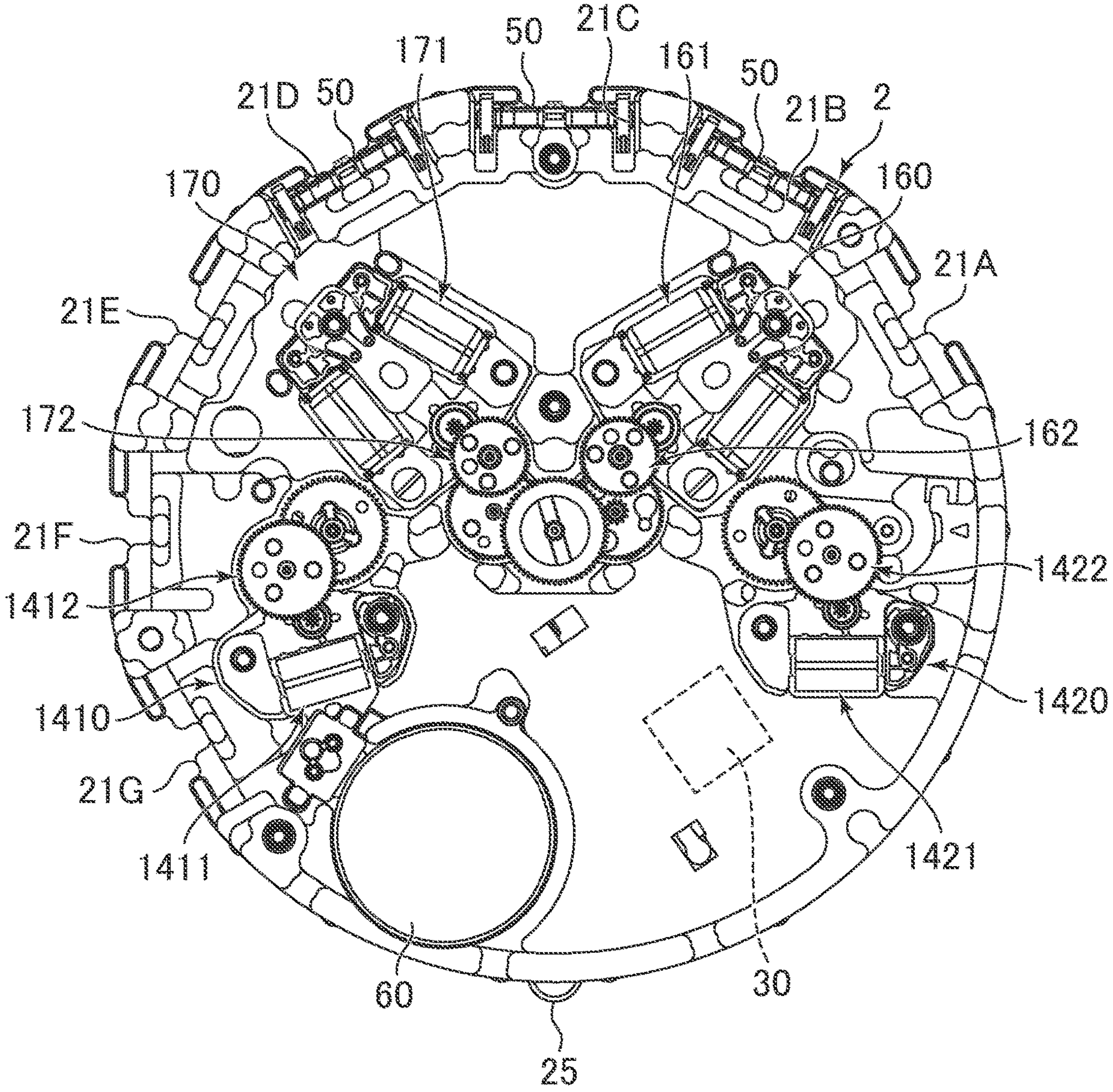
FIG. 5 is a plan view of a part of the movement of the present embodiment.

The electronic time piece 100 further includes a movement 1 housed in the outer case 10. In the following, referring to FIGS. 3 to 5, the configuration of the movement 1 of the present embodiment will be described. FIG. 3 is a perspective view of the movement of the present embodiment. FIG. 4 is an exploded perspective view of the movement shown in FIG. 3. FIG. 5 is a plan view of a part of the movement of the present embodiment. In FIGS. 3, 4, and 5, the movement 1 is viewed from the back side. FIG. 5 shows the layout of the control circuit 30 to be implemented in the circuit block 3 (described later with reference to FIG. 7) by a broken line. Although a large number of electronic components are mounted on the circuit block 3 in addition to the control circuit 30, FIG. 5 omits some of the electronic components as appropriate.

The movement 1 is integrally formed of a main plate 2, a circuit block 3, and a battery spacer 4. The main plate 2, the circuit block 3, and the battery spacer 4 are provided in this order from the front side to the back side.

As shown in FIGS. 3 and 4, the battery spacer 4 supports a battery 41. The battery 41 may be, for example, a primary battery. However, the present invention is not limited thereto, the battery 41 may be a button-type lithium secondary battery.

In the outer peripheral portion of the battery spacer 4, notches 42A to 42G are provided to correspond to mounting portions 21A to 21G to be described later. The notches 42A to 42D thus formed prevent the battery spacer 4 from being interfered with the switch member 50 mounted on the mounting portion 21. Although not described with reference numerals, the circuit block 3 also includes notches 31A to 31G (only 32B, 32C, 32D, 32E, 32F, and 32G are shown in FIG. 4) corresponding to the mounting portions 21A to 21G in its outer periphery.

As shown in FIG. 5, a vibration motor 60 is incorporated in the main plate 2. The vibration motor 60 is provided for a vibration function of the electronic time piece 100. The vibration motor 60 may be disposed so as not to overlap the area between the mounting portions 21A to 21G described later and the hand shaft 18 (the center of the dial 14) of the minute hand 16 and the hour hand 17 in a plan view. Such a layout can achieve space saving in the main plate 2 and balance the position of the center of gravity of the entire electronic time piece 100.

FIG. 5 shows an example in which the vibration motor 60 having a circular planar shape is incorporated, although a battery and sensors may be disposed instead at the position where the vibration motor 60 is disposed in FIG. 5.

As shown in FIG. 5, the main plate 2 incorporates a drive mechanism 160 for driving the minute hand 16, a drive mechanism 170 for driving the hour hand 17, a drive mechanism 1410 for driving the function hand 141*a*, and a drive mechanism 1420 for driving the function hand 142*a*.

The drive mechanism 160 includes a drive motor 161 and a gear train 162 for driving the minute hand 16. The drive mechanism 170 includes a drive motor 171 and a gear train 172 for driving the hour hand 17. FIG. 5 shows a two-coil step motor as the drive motors 161 and 171.

The drive mechanism 1410 includes a drive motor 1411 and a wheel train 1412 for driving the function hand 141*a*. The drive mechanism 1420 includes a drive motor 1421 and a wheel train 1422 for driving the function hand 142*a*.

The mounting portions 21A to 21G are formed on the outer periphery of the main plate 2. The mounting portions are portions on which switch members 50 are disposed and mounted. In the present embodiment, an example will be described in which seven mounting portions are formed in accordance with the number of terminal portions provided in the circuit block to be described later. In the present specification, when it is not necessary to distinguish between the mounting portions, they are simply referred to as "mounting portion 21." In the present embodiment, the switch members 50 to be described later are mounted on any three of the seven mounting portions 21 adjacent to one another. Further, the movement 1 is housed in the outer case 10 such that the mounting portion 21 in the middle of the three mounting portions 21 to which the switch members 50 are mounted is positioned at 3 o'clock.

The mounting portions 21A to 21G are provided at substantially equal intervals in the circumferential direction, where the intervals correspond to disposing angles of the movement 1 with respect to the outer case 10.

As shown in FIG. 5, the main plate 2 has a convex portion 25, which is a positioned portion, on its outer periphery. The case body 110 of the outer case 10 has a concave portion 15, which is a positioning portion, on its inner peripheral portion (see e.g., FIG. 9A to be described later). The positioning portion 15 is provided on at least one of the movement 1 and the outer case 10, and the positions of the mounting portions 21A to 21G, which are disposing portions, are determined based on the position provided by the positioning portion 15.

The convex portion 25 is fitted into the concave portion 15, whereby the disposing angle of the movement 1 with respect to the outer case 10 is determined. That is, depending on the position where the concave portion 15 is formed in the circumferential direction, the disposing angle of the movement 1 with respect to the outer case 10 can be determined. In other words, the convex portion 25 and the concave portion 15 function as a rotation stopper of the movement 1 to be housed in the outer case 10.

Figure 9A:
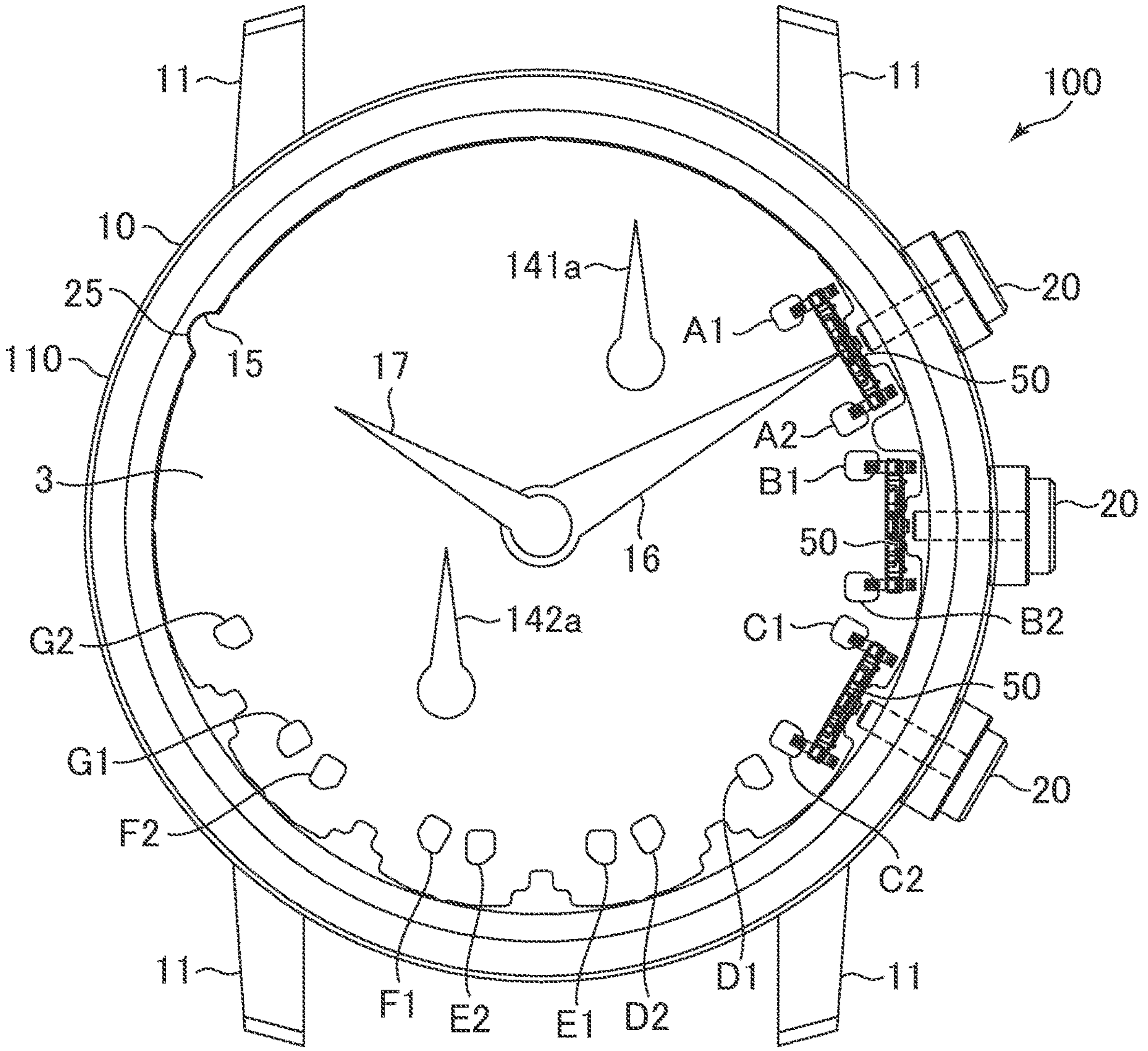
FIG. 9A is a plan view of an electronic time piece according to the first embodiment.

The concave portion 15 may be provided in accordance with the number of variations in the external appearance of the electronic time piece 100, for example, the mounting portions 21A to 21G, which are the disposing portions. That is, in the present embodiment, five concave portions 15 may be formed in the case body 110 of the outer case 10. In this manner, the outer case 10 can be commonly used, and the disposing angle of the movement 1 with respect to the outer case 10 can be changed in accordance with the appearance of the electronic time piece 100. On the other hand, in a case where one concave portion 15 is formed as shown in FIG. 9A, when the movement 1 is removed from the outer case 10 for repairing the electronic time piece 100 and then re-assembled, for example, the advantage is that the disposing angle of the movement 1 with respect to the outer case 10 cannot be mistaken.

In the present embodiment, the convex portion is provided in the main plate 2, although the present invention is not limited to this and the convex portion may be formed in any of the members composing the movement 1.

Further, in this embodiment, the concave portion 15 is provided in the case body 110 of the outer case 10 and the convex portion 25 is provided in the main plate 2, although the present invention is not limited thereto and the convex portion may be provided in the case body 110 of the outer case 10 and the concave portion may be provided in the main plate 2.

As shown in FIG. 4, each switch member 50 has a main body 51, a conductive spring 52*a*, and a conductive spring 52*b*. A switch 51*a* (see FIGS. 6A and 6B) is provided at the center of the main body 51. The conductive spring 52*a* and the conductive spring 52*b* are spaced apart from each other via the main body 51. The conductive spring 52*a* and the conductive spring 52*b* are electrically connected to any of the terminals A1 to G2 (see FIG. 7) provided in the circuit block 3 while the switch member 50 is mounted on the mounting portion 21. For example, when the switch member 50 is mounted on the mounting portion 21A, the conductive spring 52*a* is electrically connected to the terminal A1, and the conductive spring 52*b* is electrically connected to the terminal A2.

In the present embodiment, only three switch members 50 are provided in accordance with the number of push buttons 20, although the present invention is not limited to this and the switch members 50 may be mounted on all of the mounting portions 21A to 21G, for example. In such a case, switch members other than the switch members provided corresponding to the push buttons 20 are not used to execute the functions of the electronic time piece 100.

Figure 6A:
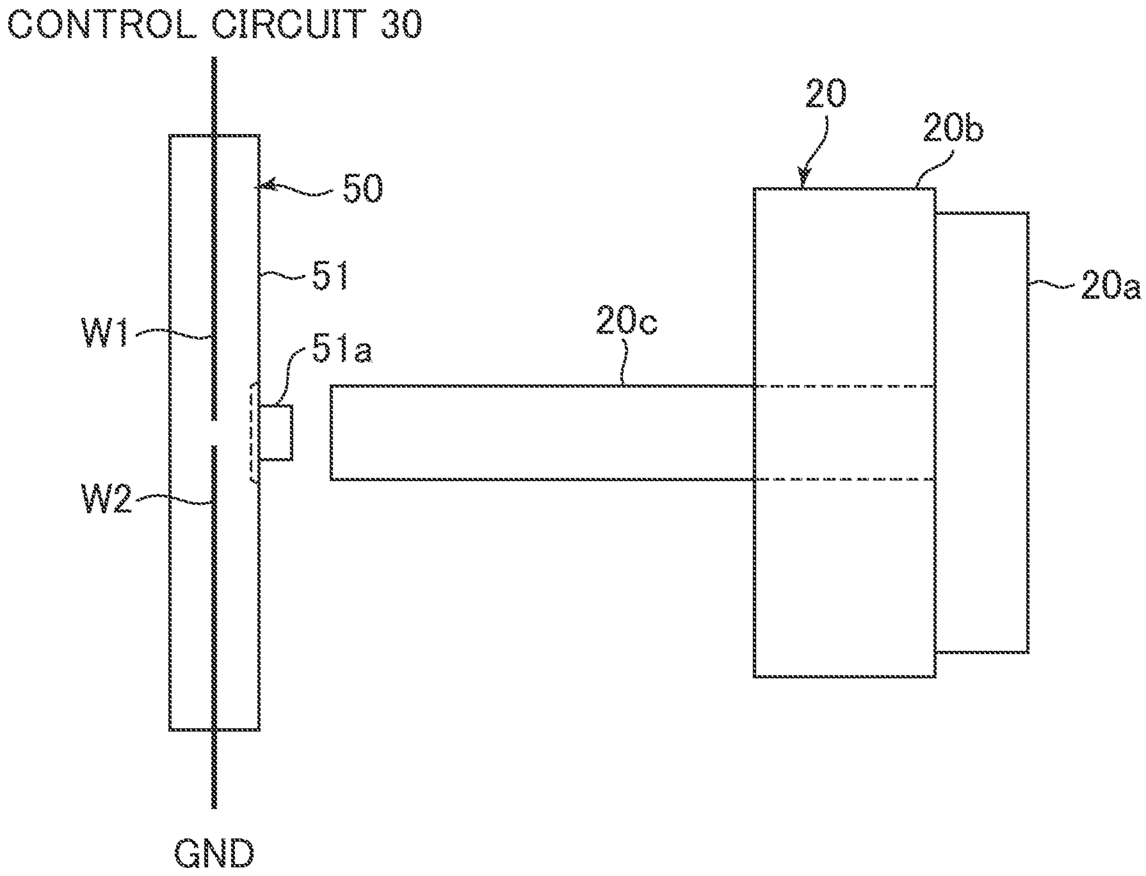
FIG. 6A is a schematic side view of a push button and a switch member.
Figure 6B:
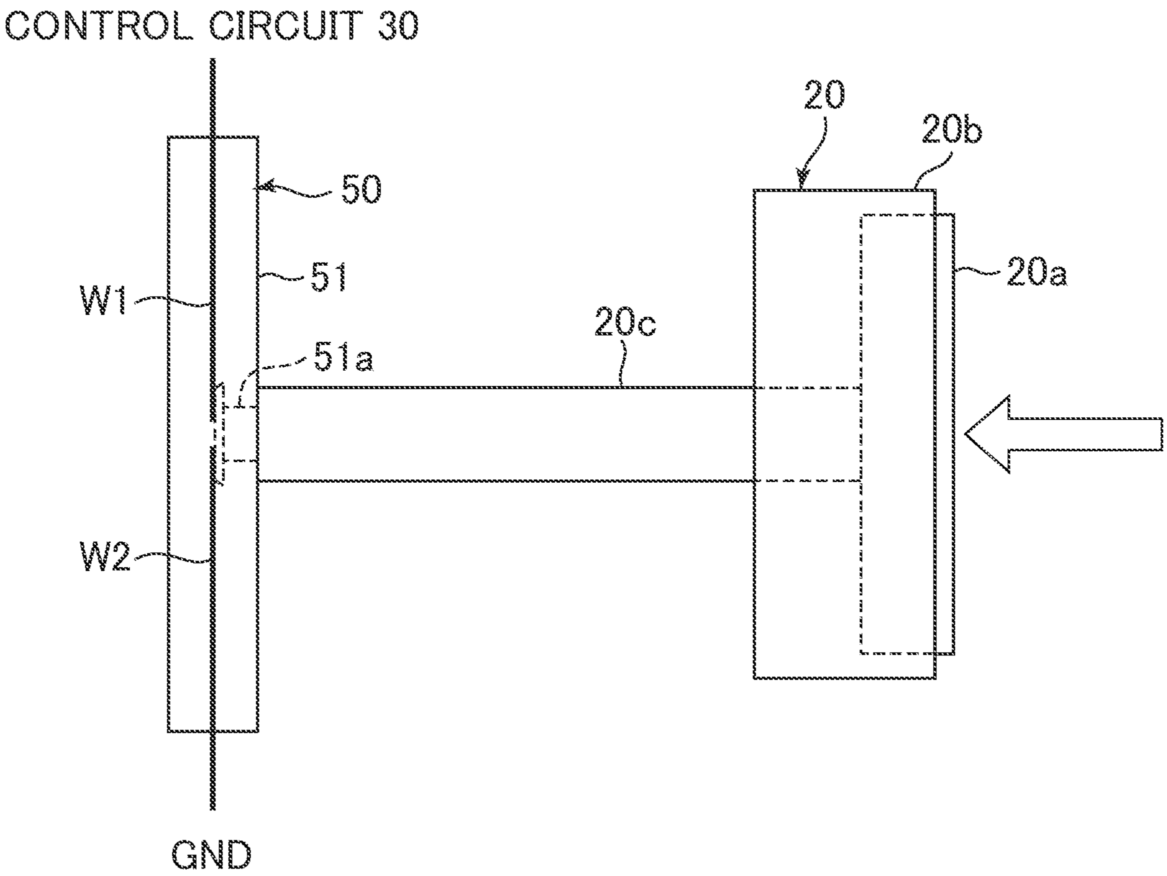
FIG. 6B is a schematic side view of a push button and a switch member.

Referring to FIGS. 6A and 6B, the configuration and operations of the push button 20 and the switch member 50 will be described in detail. FIGS. 6A and 6B are schematic side views of the push button and the switch member. FIG. 6A shows a button portion in a state before being pressed by the user, and FIG. 6B shows a button portion is pressed by the user.

The push button 20 includes a button portion 20*a*, a housing 20*b*, and a pressing portion 20*c*. The button portion 20*a* and the pressing portion 20*c* are fixed to each other. The button portion 20*a* and the pressing portion 20*c* are relatively movably provided with respect to the housing 20*b*.

As shown in FIG. 6B, when the button portion 20*a* is pressed by the user, the button portion 20*a* enters the inside of the housing 20*b*. Accordingly, the switch 51*a* of the switch member 50 is pressed by the pressing portion 20*c*. In that state, wire W (wire W2 shown in FIG. 7 to be described later) for connecting the control circuit 30 and GND is energized, and a switch signal is input to a control circuit 30. The GND may be a metal outer case 10, for example.

The control circuit 30 executes functions based on the input switch signal. For example, the control circuit 30 drives the drive mechanisms 160, 170, 1410, and 1420 based on the input switch signal.

The button portion 20*a* is attached to the housing 20*b* via a spring (not shown), for example. As the user's finger moves away from the button portion 20*a*, the button portion 20*a* may return to the state shown in FIG. 6A from the state shown in FIG. 6B by the elastic force of the spring.

Figure 7:
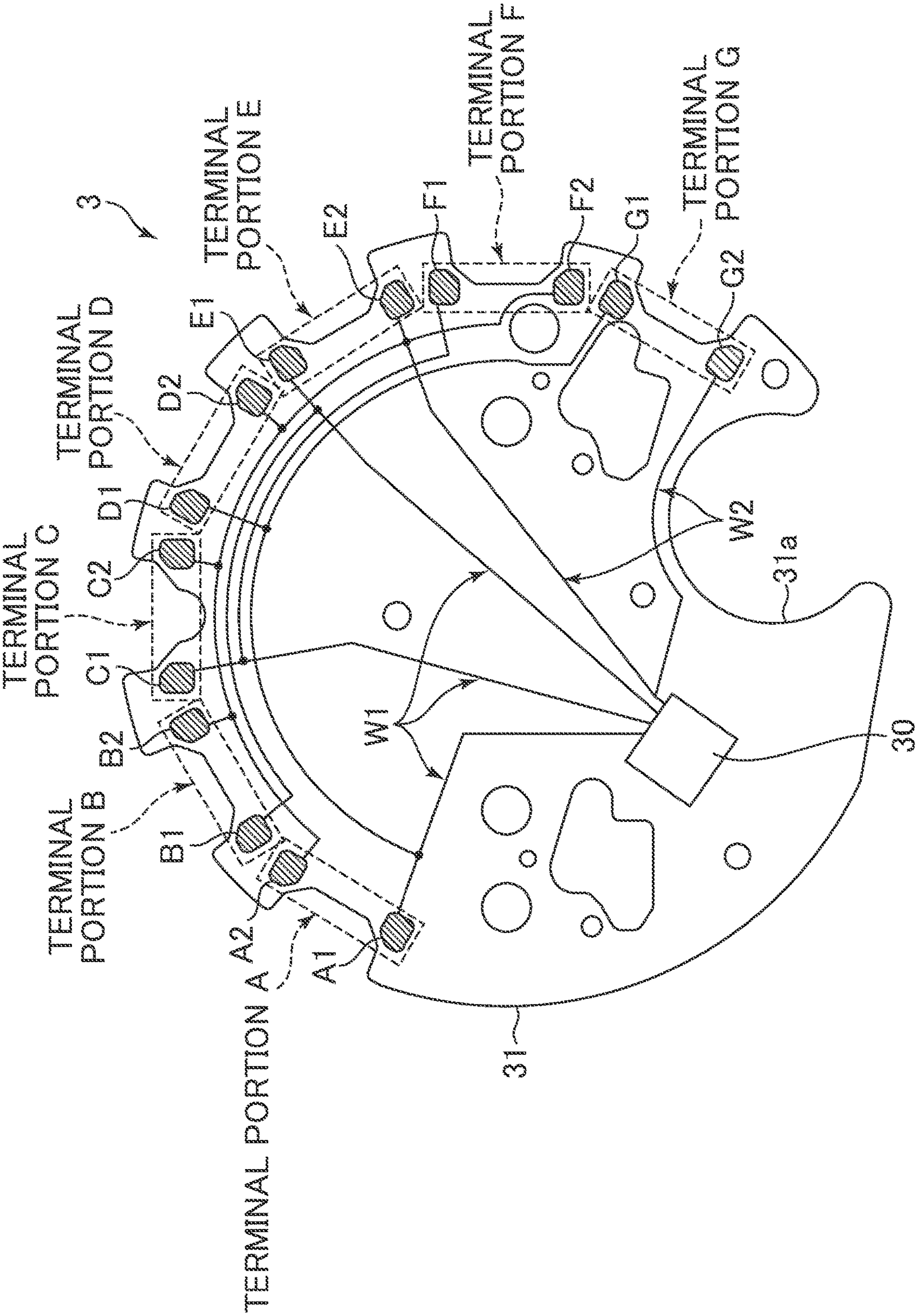
FIG. 7 is a plan view of the circuit block of the present embodiment.

Further, referring to FIGS. 7 and 8, the circuit block 3 and the control circuit 30 in the present embodiment will be described. FIG. 7 is a plan view of the circuit block of the present embodiment. FIG. 7 shows the circuit block 3 viewed from the front side.

As shown in FIG. 7, the circuit block 3 is configured such that the wiring pattern including the terminal portions A to G and the control circuit 30 electrically connected to the terminal portions A to G via the wiring pattern are mounted on a substrate 31.

As shown in FIG. 7, the substrate 31 of the circuit block 3 may have a notch 31*a* that is formed along the outer periphery of the vibration motor 60 incorporated in the main plate 2. This prevents the circuit block 3 from interfering with the vibration motor 60 and the electronic time piece 100 from increasing in size in the thickness direction.

As shown in FIG. 7, the circuit block 3 is provided with terminal portions A to G, each including two terminals. The terminal portion A is made of a terminal A1 and a terminal A2, the terminal portion B is made of a terminal B1 and a terminal B2, the terminal portion C is made of a terminal C1 and a terminal C2, the terminal portion D is made of a terminal D1 and a terminal D2, the terminal portion E is made of a terminal E1 and a terminal E2, the terminal portion F is made of a terminal F1 and a terminal F2, and the terminal portion G is made of a terminal G1 and a terminal G2. The terminals A2 to G2 may be connected to GND.

As shown in FIG. 7, the control circuit 30 is connected to the terminals A1 to G1 through the wire W1 and to the terminals A2 to G2 through the wire W2.

The terminal portions A to G of the circuit block 3 are respectively disposed at positions corresponding to the mounting portions 21A to 21G of the main plate 2 shown in FIG. 5, for example.

Figure 8:
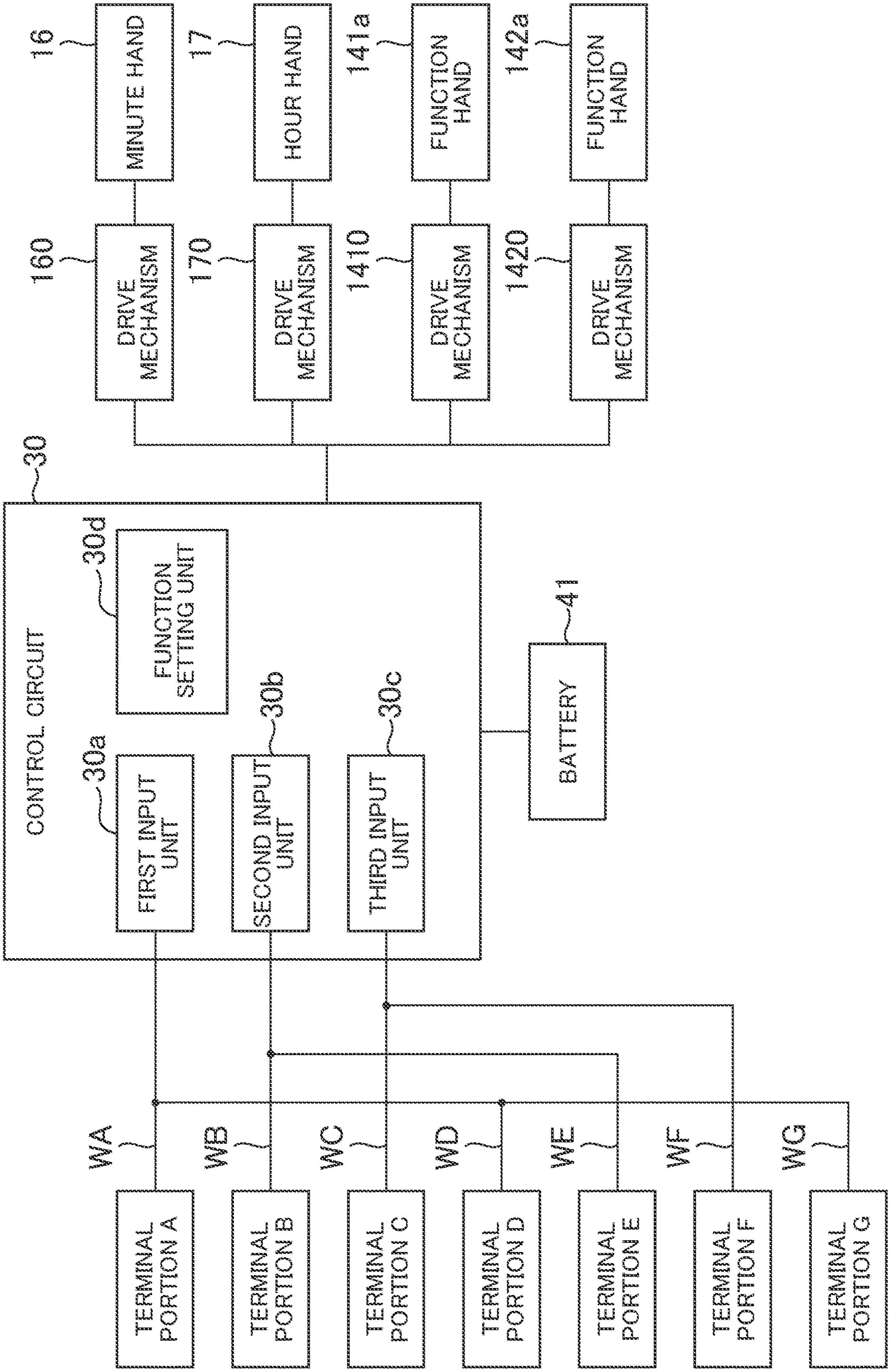
FIG. 8 is a block diagram showing a functional configuration of the electronic time piece according to the present embodiment.

FIG. 8 is a block diagram showing a functional configuration of the electronic time piece according to the present embodiment. The control circuit 30 controls the circuits included in the movement 1, and controls at least the operation of the function hands 141*a* and 142*a* disposed on the sub dials 141 and 142 being the function display units.

As shown in FIG. 8, the control circuit 30 includes a first input unit 30*a*, a second input unit 30*b*, a third input unit 30*c*, and a function setting unit 30*d*.

The terminal portion A is electrically connectable to the first input unit 30*a* through the wire WA. The terminal portion B is electrically connectable to the second input unit 30*b* through the wire WB. The terminal portion C is electrically connectable to the third input unit 30*c* through the wire WC. The terminal portion D is electrically connectable to the first input unit 30*a* through the wire WD. The terminal portion E is electrically connectable to the second input unit 30*b* through the wire WE. The terminal portion F is electrically connectable to the third input unit 30*c* through the wire WF. The terminal portion G is electrically connectable to the first input unit 30*a* through the wire WG.

As shown in FIGS. 7 and 8, the wire WA, the wire WD, and the wire WG share a common part. As a result, the potentials of the terminal A1, the terminal D1, and the terminal G1 are common.

Further, the wire WB and the wire WE share a common part. As a result, the potentials of the terminal B1 and the terminal E1 are common.

Further, the wire WC and the wire WF share a common part. As a result, the potentials of the terminal C1 and the terminal F1 are common.

Such a wiring pattern makes it possible to input switch signals from the terminal portion A, the terminal portion D, and the terminal portion G to the first input unit 30*a*. Further, it is possible to input switch signals from the terminal portion B and the terminal portion E to the second input unit 30*b*. Further, it is possible to input switch signals from the terminal portion C and the terminal portion F to the third input unit 30*c*.

The functions setting unit 30*d* sets the functions to be executed by the first input unit 30*a*, the second input unit 30*b*, and the third input unit 30*c* when the switching signal is entered. The functions set by the function setting unit 30*d* may be previously stored in the manufacturing process of the electronic time piece 100. Which function is to be assigned to each switch member 50 may be set by storing the switch information in a non-volatile memory contained in the MCU (Memory Control Unit), for example. This enables the control circuit 30 to accurately determine a function to be assigned to each switch member 50.

The functions set by the function setting unit 30*d* may be switchable by the user. The functions may be switchable by the user by operating an operating member such as the push-button 20, or may be switchable by wireless communication using a wireless function such as Wi-Fi (registered trademark) or Bluetooth (registered trademark).

Specifically, for example, the control circuit 30 may execute the function 1 when the switch signal is input to the first input unit 30*a*, execute the function 2 when the switch signal is input to the second input unit 30*b*, and the function 3 when the switch signal is input to the third input unit 30*c*. The functions 1, 2, and 3 may be, for example, a reception operation and a charge amount display, and such functions may be indicated by the operation of each time hand and each function hand.

For example, when a switch signal is entered simultaneously to each input unit, i.e., a function to be executed when a plurality of push buttons 20 are pressed at the same time may be set in advance by the function setting unit 30*d*. Further, the function to be executed when the push button 20 is pressed and hold may be set by the function setting unit 30*d* in advance.

Next, the first to fifth embodiments of the present embodiment will be described in detail. The electronic time piece 100 according to the first to fifth embodiments uses the same movement 1.

Figure 9B:
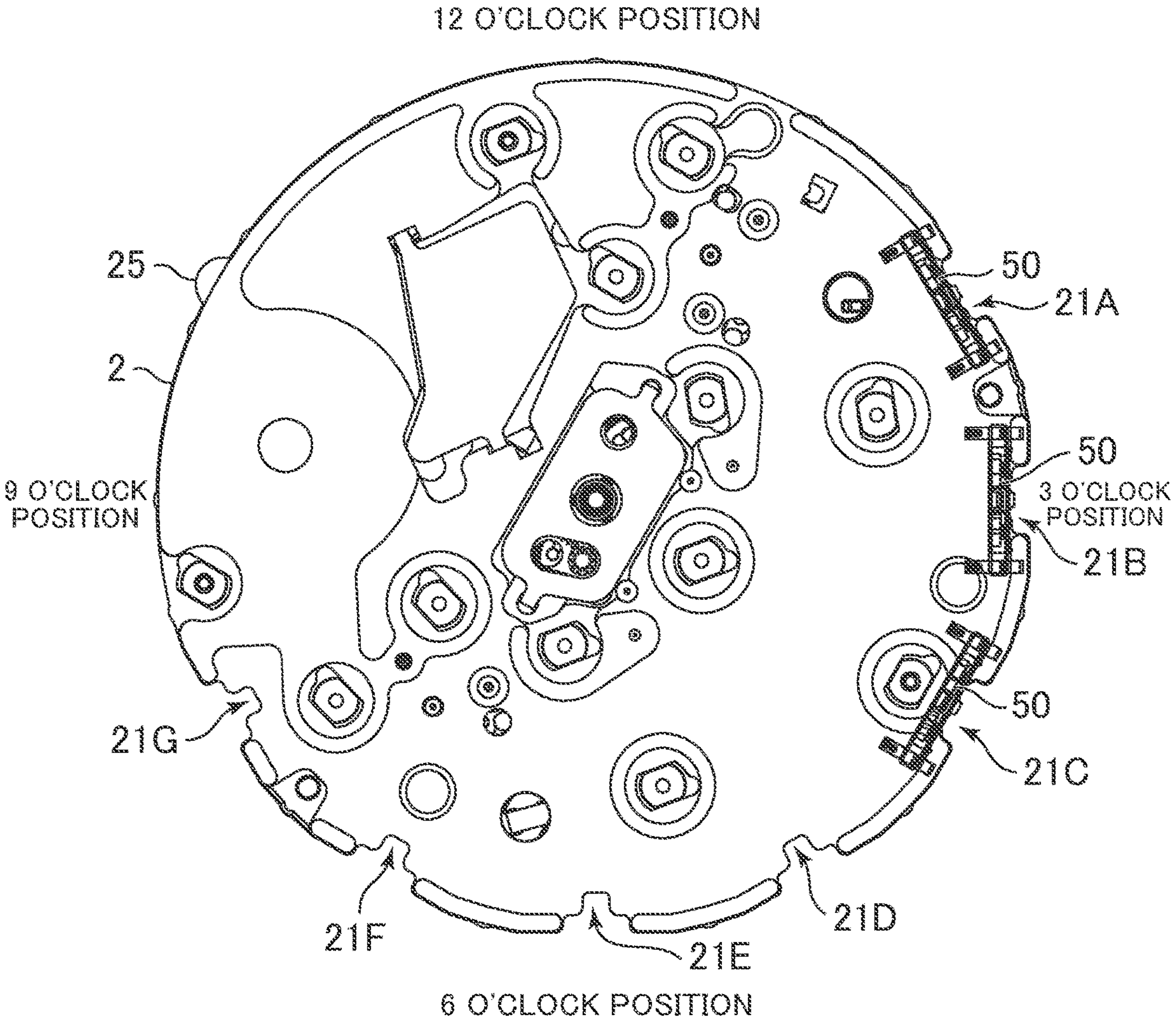
FIG. 9B is a plan view of a movement housed in the electronic time piece of the first embodiment.

Referring to FIGS. 9A to 9C, an electronic time piece according to the first embodiment of the present embodiment will be described. FIG. 9A is a plan view of an electronic time piece according to the first embodiment of the present embodiment. FIG. 9B is a plan view of a main plate housed in the electronic time piece of the first embodiment. FIG. 9C is a diagram showing functions assigned to terminal portions, which input switching signals to each input unit, and the input units in the electronic time piece of the first embodiment. In FIG. 9A, the dial 14 and the main plate 2 are omitted. That is, FIG. 9A shows the circuit block 3 visually recognized through the wind shield. The same applies to the FIGS. 10A to 13A described later.

As shown in FIGS. 9A and 9B, the switch members 50 are respectively mounted on the mounting portions 21A, 21B, and 21C in the electronic time piece 100 according to the first embodiment. In other words, the switch members 50 are not mounted on the mounting portions 21D, 21E, 21F, and 21G in the electronic time piece 100 according to the first embodiment.

In the first embodiment, the movement 1 is housed in the outer case 10 at a disposing angle in which the mounting portion 21B of the main plate 2 is at the 3 o'clock position.

In the first embodiment, as shown in FIG. 9C, the terminal portion A corresponds to the first input unit 30*a*, the terminal portion B corresponds to the second input unit 30*b*, and the terminal portion C corresponds to the third input unit 30*c*. The function setting unit 30*d* sets a function to be executed when a switch signal is input to the first input unit 30*a* as the function 1, a function to be executed when a switch signal is input to the second input unit 30*b* as the function 2, and a function to be executed when a switch signal is input to the third input unit 30*c* as the function 3.

That is, the terminal portion A and the first input unit 30*a* are electrically connectable through the wire WA, and a switch signal is entered in the first input unit 30*a* in response to the user's operation of the push button 20 corresponding to the switch member 50 mounted on the mounting portion 21A. In response to the input of a switch signal to the first input unit 30*a*, the control circuit 30 executes the function 1.

The terminal portion B and the second input unit 30*b* are electrically connectable through the wire WB, and a switch signal is entered in the second input unit 30*b* in response to the user's operation of the push button 20 corresponding to the switch member 50 mounted on the mounting portion 21B. In response to the input of a switch signal to the second input unit 30*b*, the control circuit 30 executes the function 2.

The terminal portion C and the third input unit 30*c* are electrically connectable through the wire WC, and a switch signal is entered in the third input unit 30*c* in response to the user's operation of the push button 20 corresponding to the switch member 50 mounted on the mounting portion 21C. In response to the input of a switch signal to the third input unit 30*c*, the control circuit 30 executes the function 3.

Figure 10A:
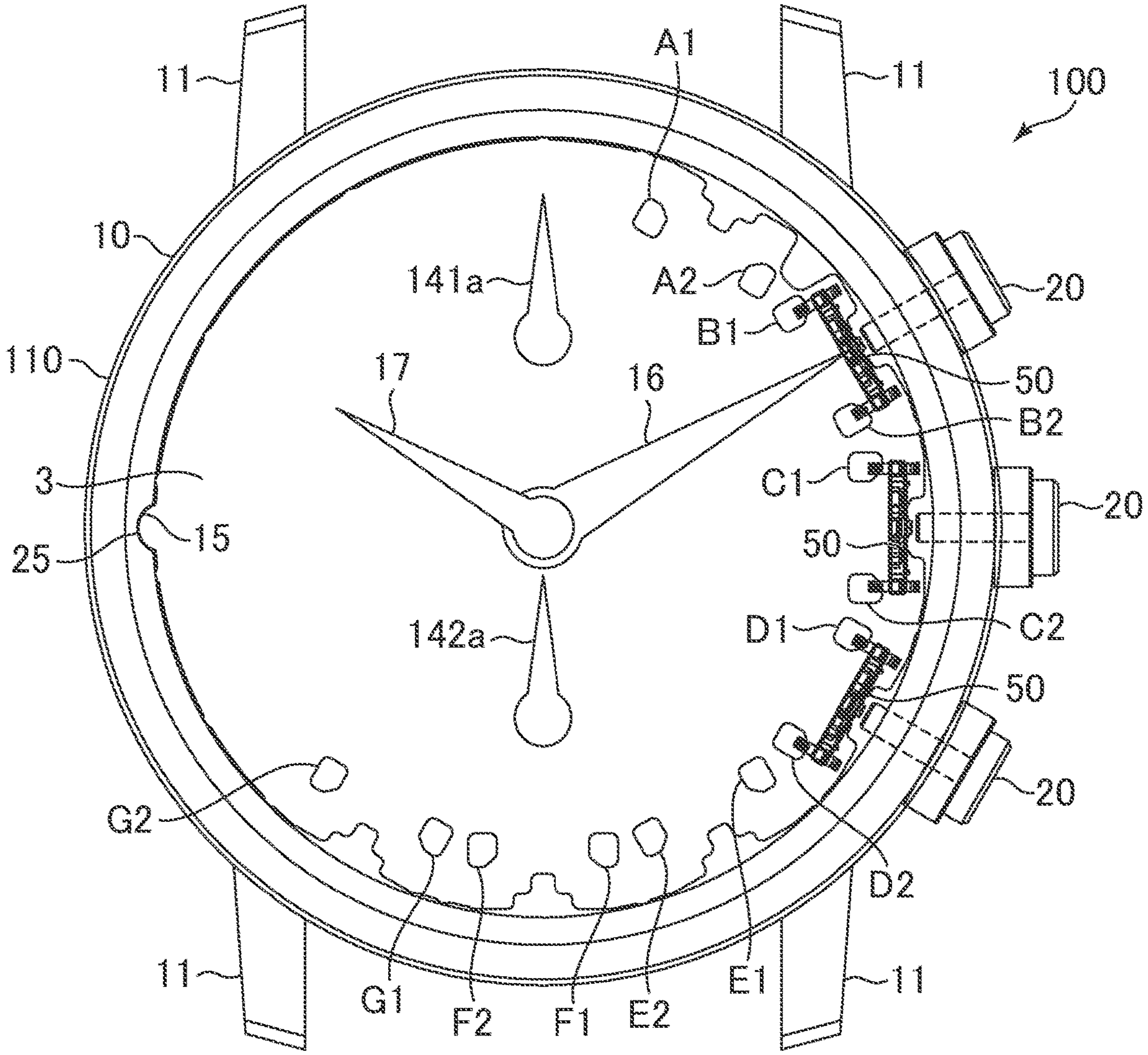
FIG. 10A is a plan view of an electronic time piece according to the second embodiment.
Figure 10B:
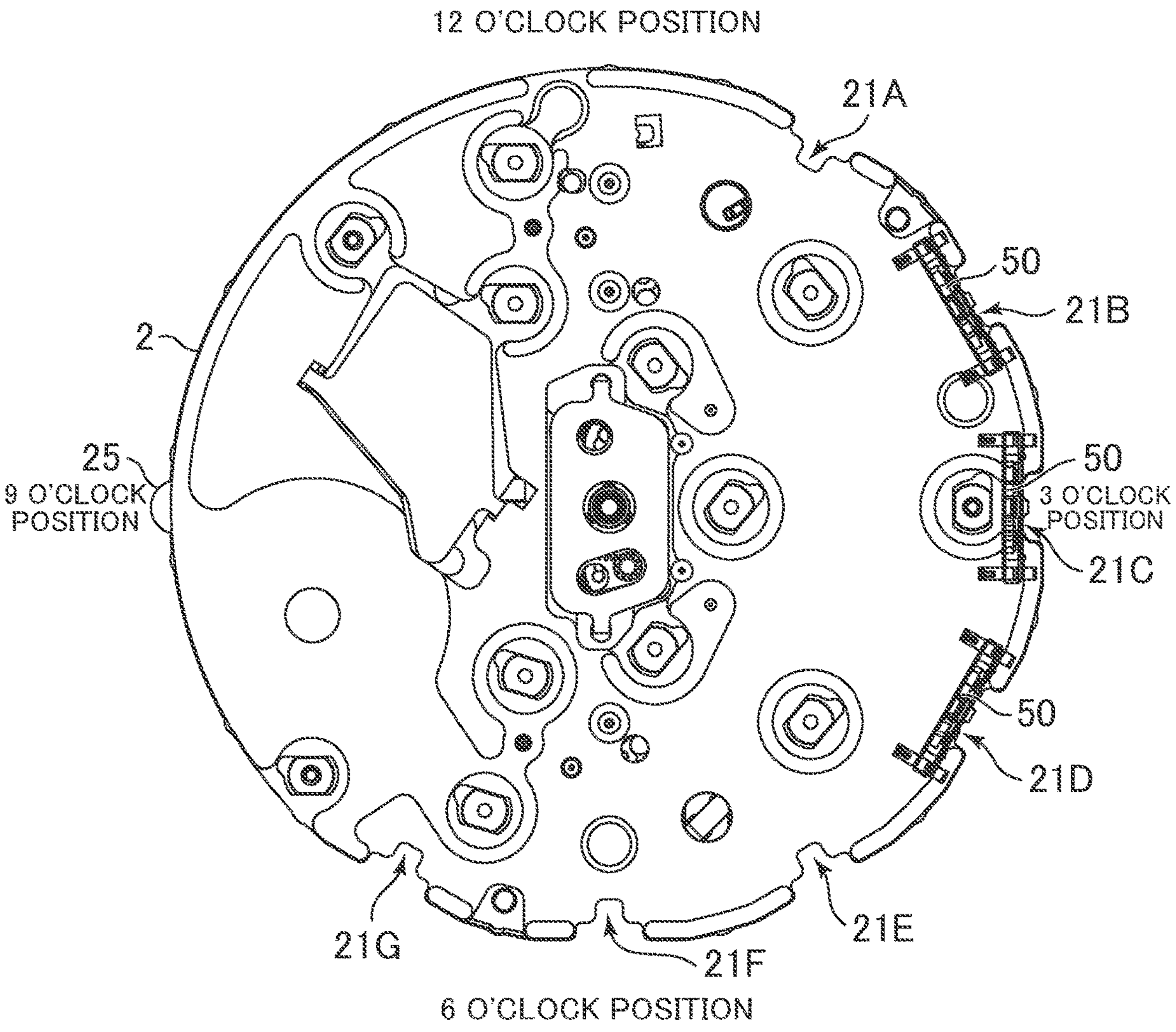
FIG. 10B is a plan view of a movement housed in the electronic time piece of the second embodiment.

Similarly, referring to FIGS. 10A to 10C, an electronic time piece according to the second embodiment of the present embodiment will be described. FIG. 10A is a plan view of an electronic time piece according to the second embodiment of the present embodiment. FIG. 10B is a plan view of a main plate housed in the electronic time piece of the second embodiment. FIG. 10C is a diagram showing functions assigned to terminal portions, which input switching signals to each input unit, and the input units in the electronic time piece of the second embodiment.

As shown in FIGS. 10A and 10B, the switch members 50 are respectively mounted on the mounting portions 21B, 21C, and 21D in the electronic time piece 100 according to the second embodiment. In other words, the switch members 50 are not mounted on the mounting portions 21A, 21E, 21F, and 21G in the electronic time piece 100 according to the second embodiment.

In the second embodiment, the movement 1 is housed in the outer case 10 at a disposing angle in which the mounting portion 21C of the main plate 2 is at the 3 o'clock position.

In the second embodiment, as shown in FIG. 10C, the terminal portion B corresponds to the second input unit 30*b*, the terminal portion C corresponds to the third input unit 30*c*, and the terminal portion D corresponds to the first input unit 30*a*. The function setting unit 30*d* sets a function to be executed when a switch signal is input to the second input unit 30*b* as the function 1, a function to be executed when a switch signal is input to the third input unit 30*c* as the function 2, and a function to be executed when a switch signal is input to the first input unit 30*a* as the function 3.

That is, the terminal portion B and the second input unit 30*b* are electrically connectable through the wire WB, and a switch signal is entered in the second input unit 30*b* in response to the user's operation of the push button 20 corresponding to the switch member 50 mounted on the mounting portion 21B. In response to the input of a switch signal to the second input unit 30*b*, the control circuit 30 executes the function 1.

The terminal portion C and the third input unit 30*c* are electrically connectable through the wire WC, and a switch signal is entered in the third input unit 30*c* in response to the user's operation of the push button 20 corresponding to the switch member 50 mounted on the mounting portion 21C. In response to the input of a switch signal to the third input unit 30*c*, the control circuit 30 executes the function 2.

The terminal portion D and the first input unit 30*a* are electrically connectable through the wire WA, and a switch signal is entered in the first input unit 30*a* in response to the user's operation of the push button 20 corresponding to the switch member 50 mounted on the mounting portion 21D. In response to the input of a switch signal to the first input unit 30*a*, the control circuit 30 executes the function 3.

Figure 11A:
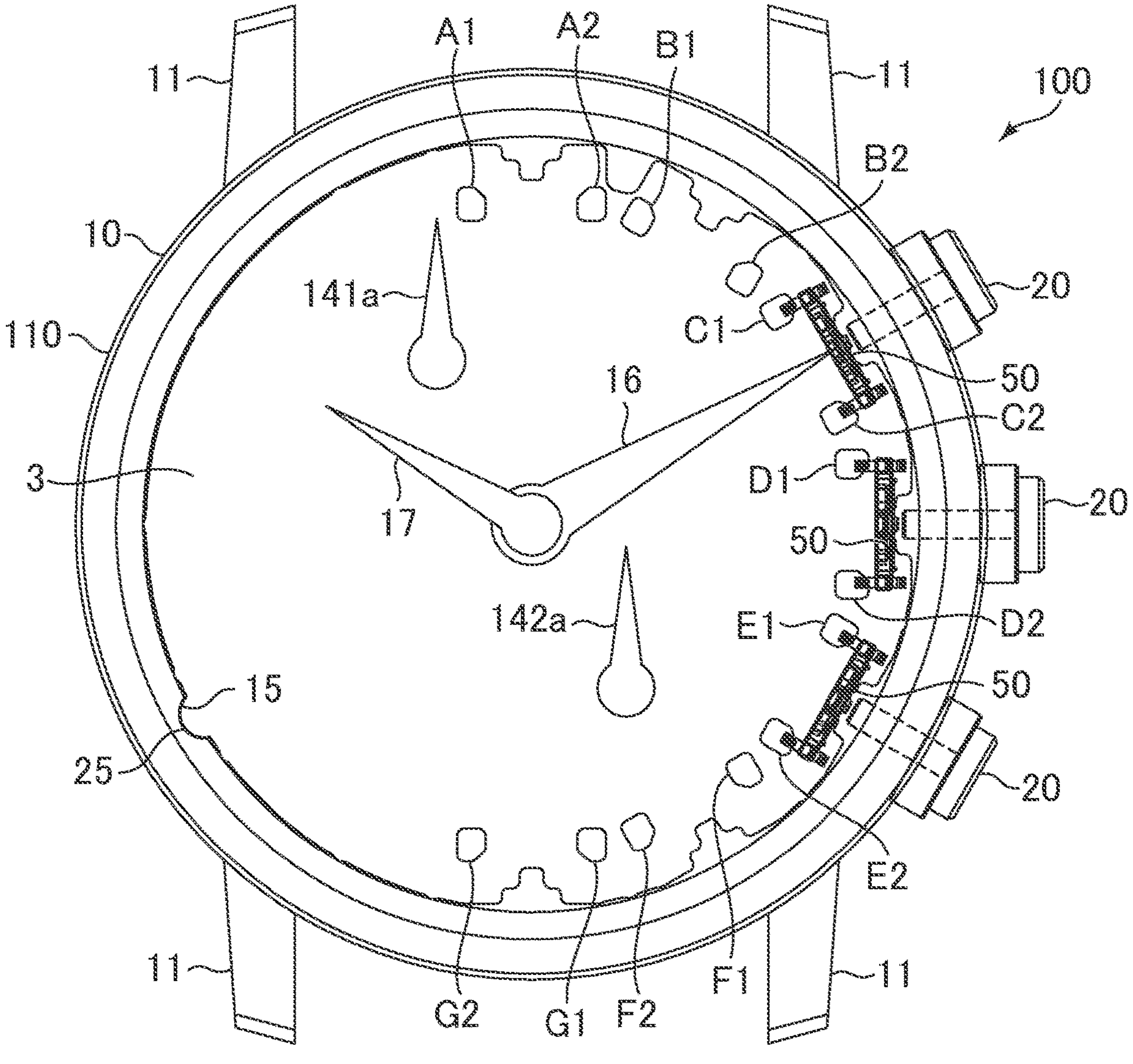
FIG. 11A is a plan view of an electronic time piece according to the third embodiment.
Figure 11B:
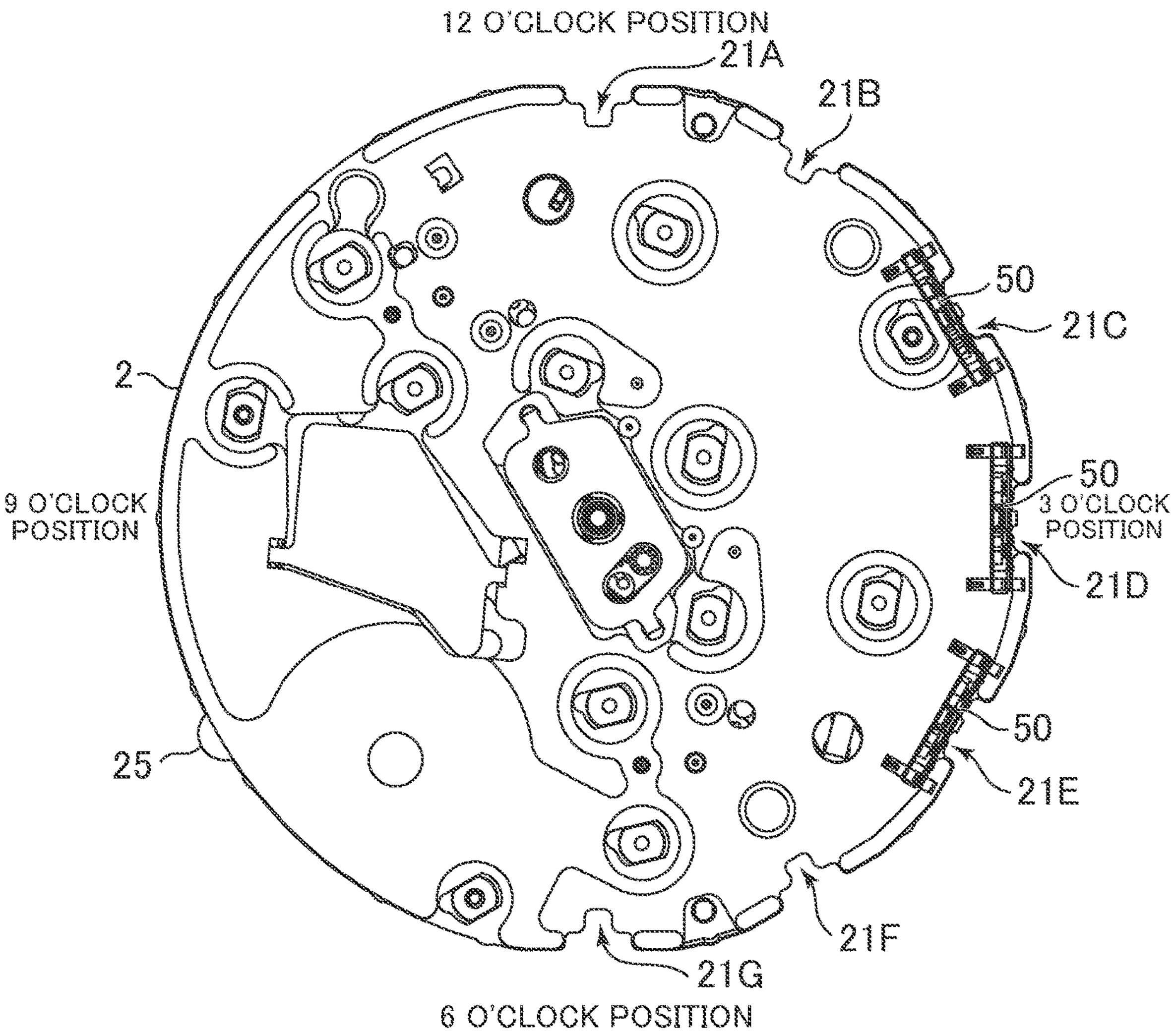
FIG. 11B is a plan view of a movement housed in the electronic time piece of the third embodiment.

Similarly, referring to FIGS. 11A to 11C, an electronic time piece according to the third embodiment of the present embodiment will be described. FIG. 11A is a plan view of an electronic time piece according to the third embodiment of the present embodiment. FIG. 11B is a plan view of a main plate housed in the electronic time piece of the third embodiment. FIG. 11C is a diagram showing functions assigned to terminal portions, which input switching signals to each input unit, and the input units in the electronic time piece of the third embodiment.

As shown in FIGS. 11A and 11B, the switch members 50 are respectively mounted on the mounting portions 21C, 21D, and 21E in the electronic time piece 100 according to the third embodiment. In other words, the switch members 50 are not mounted on the mounting portions 21A, 21B, 21F, and 21G in the electronic time piece 100 according to the third embodiment.

In the third embodiment, the movement 1 is housed in the outer case 10 at a disposing angle in which the mounting portion 21D of the main plate 2 is at the 3 o'clock position.

In the third embodiment, as shown in FIG. 11C, the terminal portion C corresponds to the third input unit 30*c*, the terminal portion D corresponds to the first input unit 30*a*, and the terminal portion E corresponds to the second input unit 30*b*. The function setting unit 30*d* sets a function to be executed when a switch signal is input to the third input unit 30*c* as the function 1, a function to be executed when a switch signal is input to the first input unit 30*a* as the function 2, and a function to be executed when a switch signal is input to the second input unit 30*b* as the function 3.

That is, the terminal portion C and the third input unit 30*c* are electrically connectable through the wire WC, and a switch signal is entered in the third input unit 30*c* in response to the user's operation of the push button 20 corresponding to the switch member 50 mounted on the mounting portion 21C. In response to the input of a switch signal to the third input unit 30*c*, the control circuit 30 executes the function 1.

The terminal portion D and the first input unit 30*a* are electrically connectable through the wire WD, and a switch signal is entered in the first input unit 30*a* in response to the user's operation of the push button 20 corresponding to the switch member 50 mounted on the mounting portion 21D. In response to the input of a switch signal to the first input unit 30*a*, the control circuit 30 executes the function 2.

The terminal portion E and the second input unit 30*b* are electrically connectable through the wire WE, and a switch signal is entered in the second input unit 30*b* in response to the user's operation of the push button 20 corresponding to the switch member 50 mounted on the mounting portion 21E. In response to the input of a switch signal to the second input unit 30*b*, the control circuit 30 executes the function 3.

Figure 12A:
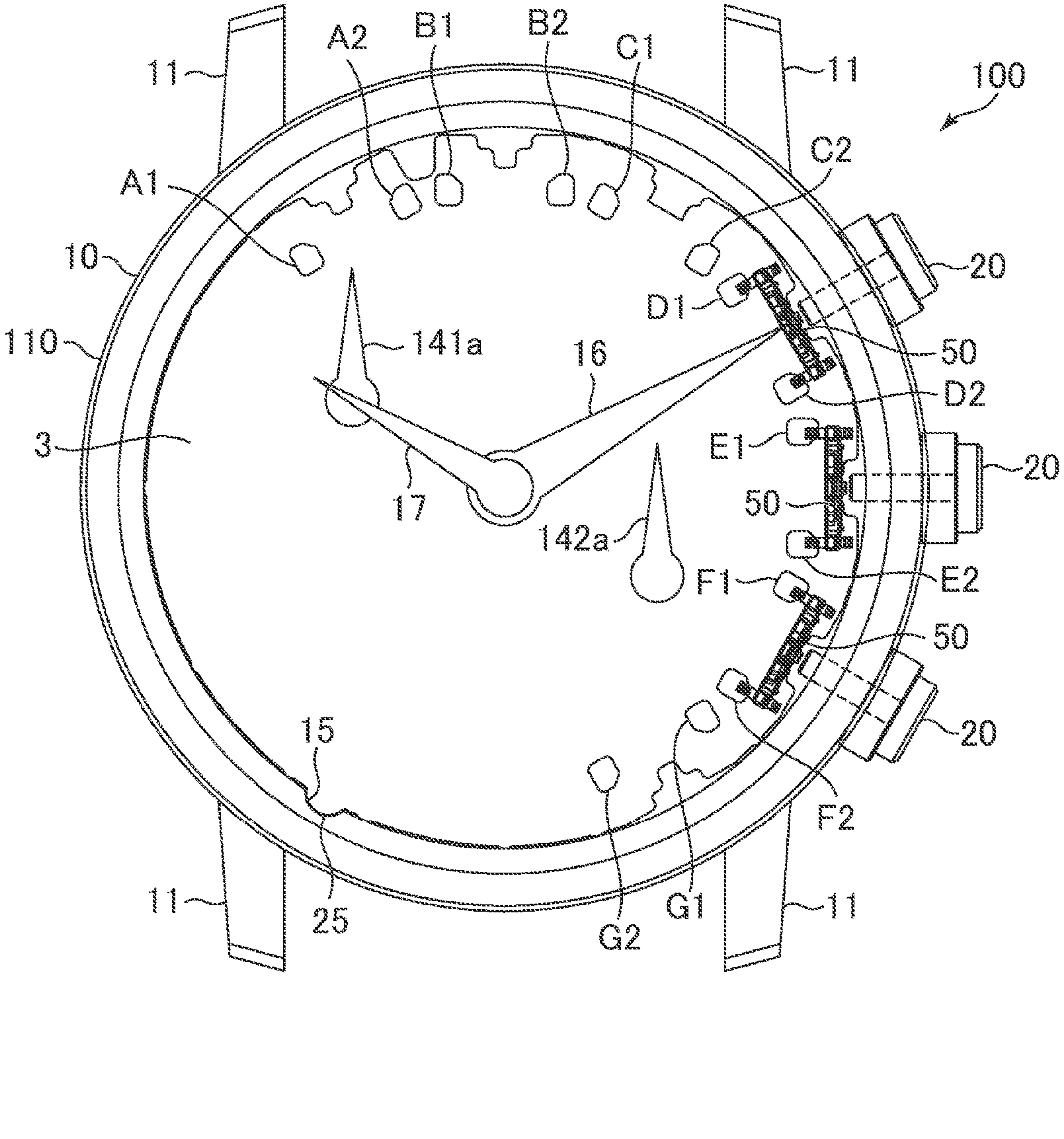
FIG. 12A is a plan view of an electronic time piece according to the fourth embodiment.
Figure 12B:
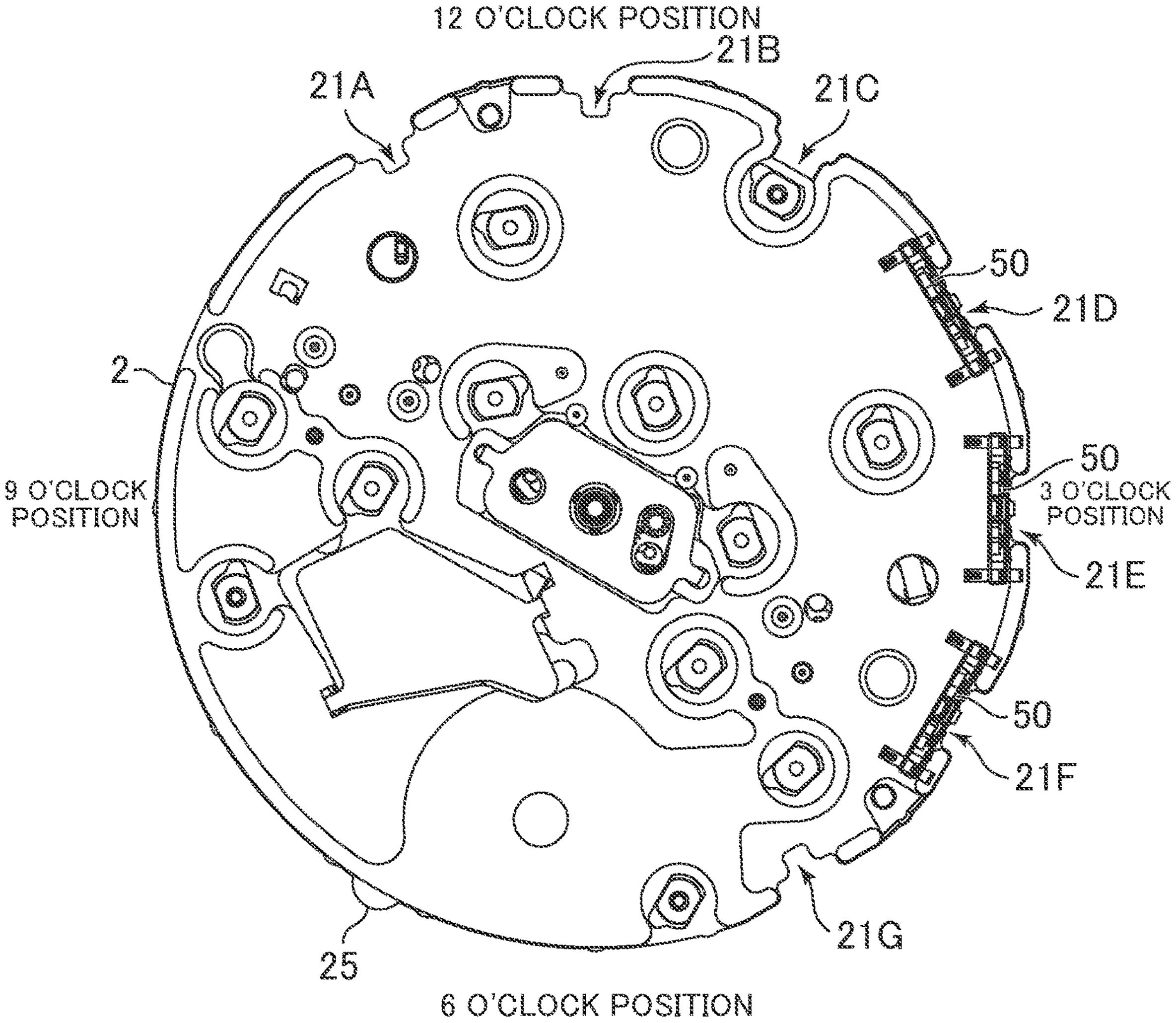
FIG. 12B is a plan view of a movement housed in the electronic time piece of the fourth embodiment.

Similarly, referring to FIGS. 12A to 12C, an electronic time piece according to the fourth embodiment of the present embodiment will be described. FIG. 12A is a plan view of an electronic time piece according to the fourth embodiment of the present embodiment. FIG. 12B is a plan view of a main plate housed in the electronic time piece of the fourth embodiment. FIG. 12C is a diagram showing functions assigned to terminal portions, which input switching signals to each input unit, and the input units in the electronic time piece of the first embodiment.

As shown in FIGS. 12A and 12B, the switch members 50 are respectively mounted on the mounting portions 21D, 21E, and 21F in the electronic time piece 100 according to the fourth embodiment. In other words, the switch members 50 are not mounted on the mounting portions 21A, 21B, 21C, and 21G in the electronic time piece 100 according to the fourth embodiment.

In the fourth embodiment, the movement 1 is housed in the outer case 10 at a disposing angle in which the mounting portion 21E of the main plate 2 is at the 3 o'clock position.

In the fourth embodiment, as shown in FIG. 12C, the terminal portion D corresponds to the first input unit 30*a*, the terminal portion E corresponds to the second input unit 30*b*, and the terminal portion F corresponds to the third input unit 30*c*. The function setting unit 30*d* sets a function to be executed when a switch signal is input to the first input unit 30*a* as the function 1, a function to be executed when a switch signal is input to the second input unit 30*b* as the function 2, and a function to be executed when a switch signal is input to the third input unit 30*c* as the function 3.

That is, the terminal portion D and the first input unit 30*a* are electrically connectable through the wire WD, and a switch signal is entered in the first input unit 30*a* in response to the user's operation of the push button 20 corresponding to the switch member 50 mounted on the mounting portion 21D. In response to the input of a switch signal to the first input unit 30*a*, the control circuit 30 executes the function 1.

The terminal portion E and the second input unit 30*b* are electrically connectable through the wire WE, and a switch signal is entered in the second input unit 30*b* in response to the user's operation of the push button 20 corresponding to the switch member 50 mounted on the mounting portion 21E. In response to the input of a switch signal to the second input unit 30*b*, the control circuit 30 executes the function 2.

The terminal portion F and the third input unit 30*c* are electrically connectable through the wire WF, and a switch signal is entered in the third input unit 30*c* in response to the user's operation of the push button 20 corresponding to the switch member 50 mounted on the mounting portion 21F. In response to the input of a switch signal to the third input unit 30*c*, the control circuit 30 executes the function 3.

Figure 13A:
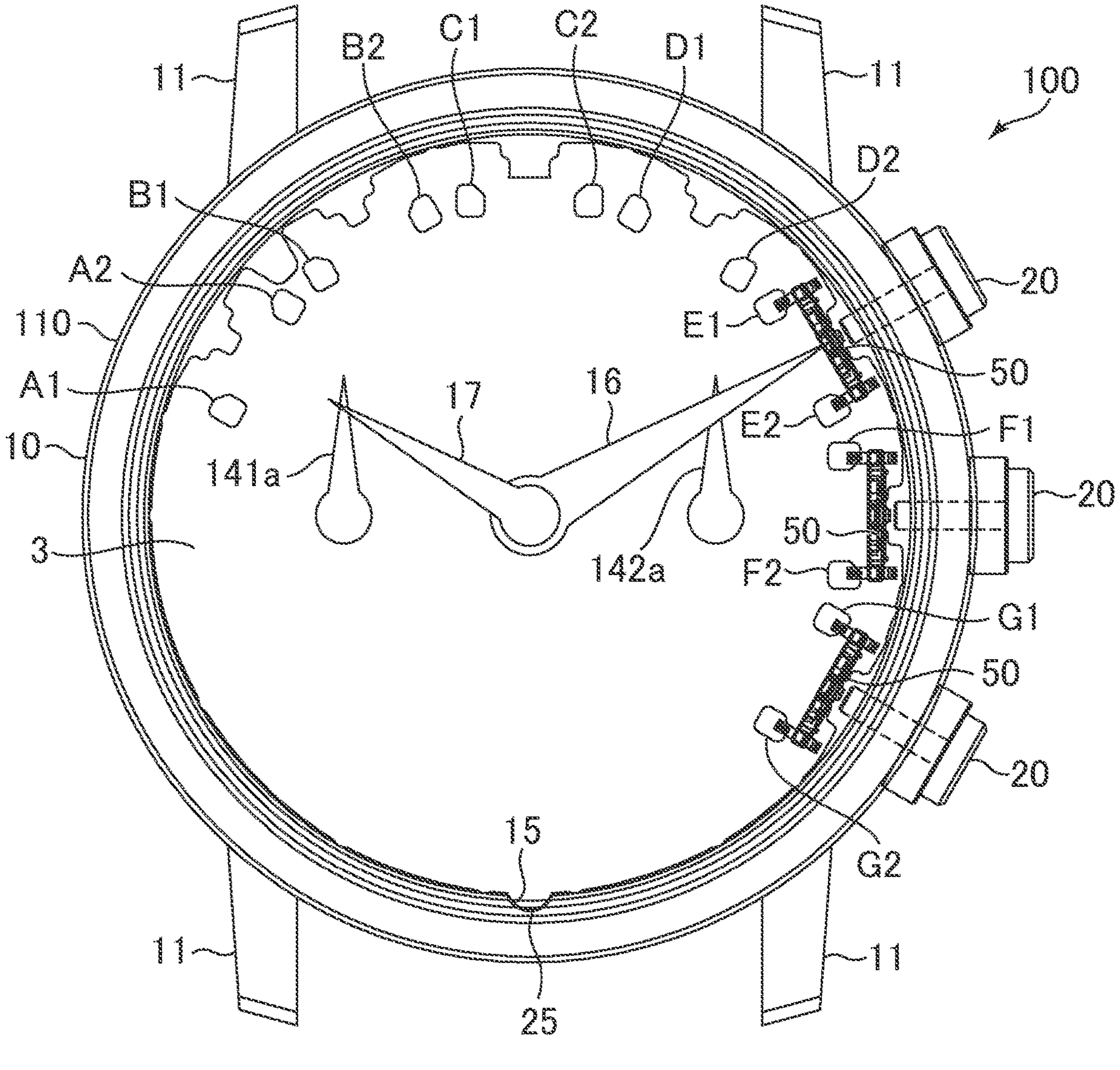
FIG. 13A is a plan view of an electronic time piece according to the fifth embodiment.
Figure 13B:
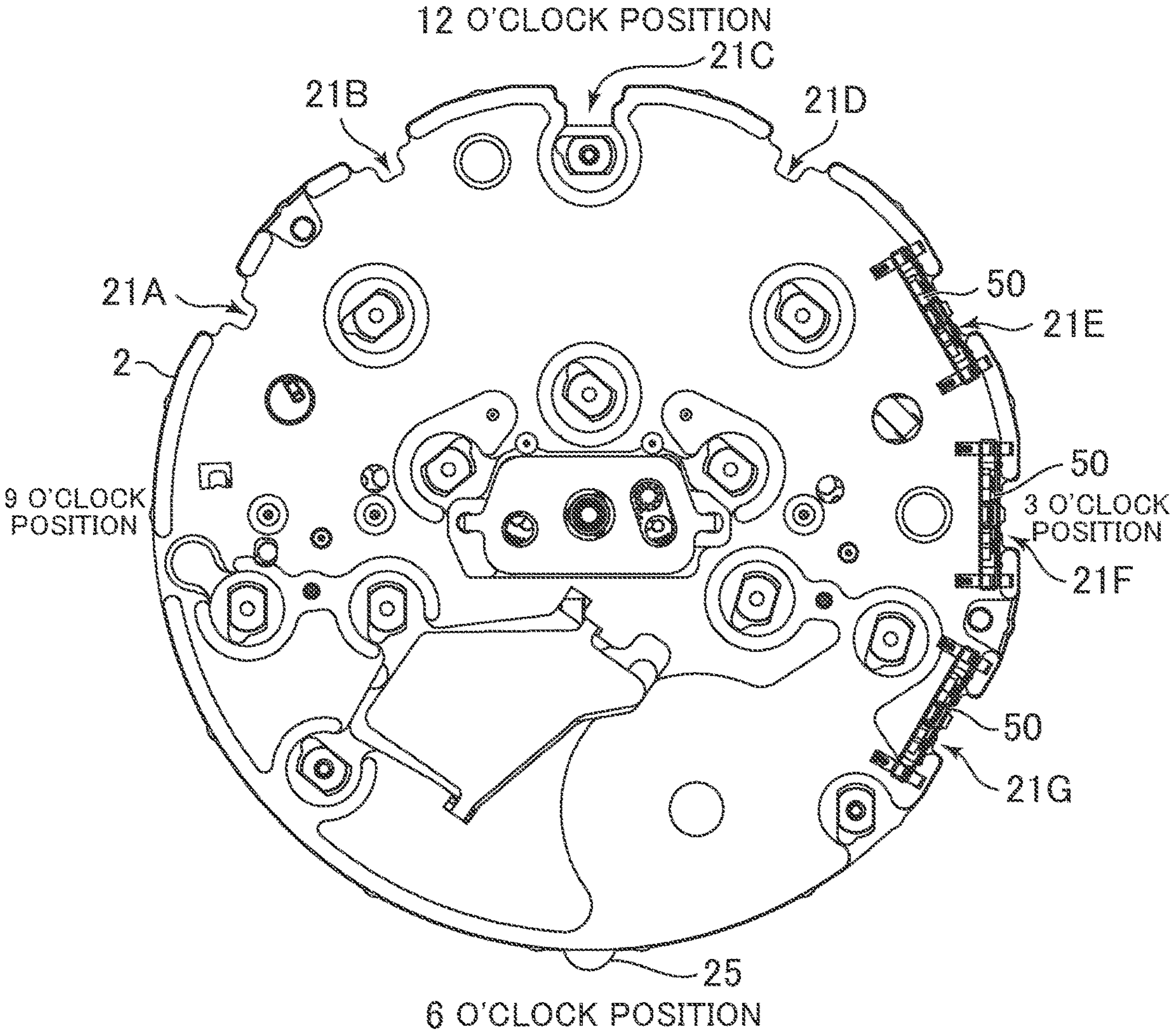
FIG. 13B is a plan view of a movement housed in the electronic time piece of the fifth embodiment.

Similarly, referring to FIGS. 13A to 13C, an electronic time piece according to the fifth embodiment of the present embodiment will be described. FIG. 13A is a plan view of an electronic time piece according to the fifth embodiment of the present embodiment. FIG. 13B is a plan view of a main plate housed in the electronic time piece of the fifth embodiment. FIG. 13C is a diagram showing functions assigned to terminal portions, which input switching signals to each input unit, and the input units in the electronic time piece of the fifth embodiment.

As shown in FIGS. 13A and 13B, the switch members 50 are respectively mounted on the mounting portions 21E, 21F, and 21G in the electronic time piece 100 according to the fifth embodiment. In other words, the switch members 50 are not mounted on the mounting portions 21A, 21B, 21C, and 21D in the electronic time piece 100 according to the fifth embodiment.

In the fifth embodiment, the movement 1 is housed in the outer case 10 at a disposing angle in which the mounting portion 21F of the main plate 2 is at the 3 o'clock position.

In the fifth embodiment, as shown in FIG. 13C, the terminal portion E corresponds to the second input unit 30*b*, the terminal portion F corresponds to the third input unit 30*c*, and the terminal portion G corresponds to the first input unit 30*a*. The function setting unit 30*d* sets a function to be executed when a switch signal is input to the second input unit 30*b* as the function 1, a function to be executed when a switch signal is input to the third input unit 30*c* as the function 2, and a function to be executed when a switch signal is input to the first input unit 30*a* as the function 3.

That is, the terminal portion E and the second input unit 30*b* are electrically connectable through the wire WE, and a switch signal is entered in the second input unit 30*b* in response to the user's operation of the push button 20 corresponding to the switch member 50 mounted on the mounting portion 21E. In response to the input of a switch signal to the second input unit 30*b*, the control circuit 30 executes the function 1.

The terminal portion F and the third input unit 30*c* are electrically connectable through the wire WF, and a switch signal is entered in the third input unit 30*c* in response to the user's operation of the push button 20 corresponding to the switch member 50 mounted on the mounting portion 21F. In response to the input of a switch signal to the third input unit 30*c*, the control circuit 30 executes the function 2.

The terminal portion G and the first input unit 30*a* are electrically connectable through the wire WG, and a switch signal is entered in the first input unit 30*a* in response to the user's operation of the push button 20 corresponding to the switch member 50 mounted on the mounting portion 21G. Then, in response to the input of the switch signal to the first input unit 30*a*, the control circuit 30 executes the function 3.

In the present embodiment described above, it is not necessary to manufacture the movement 1 separately when manufacturing electronic time pieces 100 having the fixed layout of push buttons 20 and different layouts of the sub dials 141 and 142 being the function display units. In other words, electronic time pieces 100 having different layouts of the sub dials 141 and 142 can be manufactured using the common movement 1 only by adjusting the disposing angle of the movement 1 to the outer case 10.

In the present embodiment, the wire for electrically connecting the terminal portion, which corresponds to the mounting portion 21 to which the switch member 50 is mounted, with the control circuit 30 shares a common part with the wire for electrically connecting the terminal portion, which corresponds to the mounting portion 21 to which the switch member 50 is not mounted, with the control circuit. That is, the wires extending from the terminal portions that are not used at the same time due to the layout of the push buttons 20 share a common part. Such a configuration serves to reduce the number of wires and prevents the wiring pattern from being complicated. As a result, it is possible to prevent the circuit from increasing in size. The wires extending from the terminal portions that are used at the same time (e.g., terminal portions A, B, C) due to the layout of the push buttons 20 do not share a common part.

Next, referring to FIGS. 14 and 15, the first modification of the present embodiment will be described.

In the embodiments described above, the switch members 50 are accommodated in three adjacent mounting portions 21, although in the first modification, an example in which the switch members 50 are accommodated in three mounting portions 21 that are apart from each other will be described. Specifically, as shown in FIG. 14, the push buttons 20 are disposed at the positions of 9 o'clock, 2 o'clock, and 4 o'clock.

Figure 14:
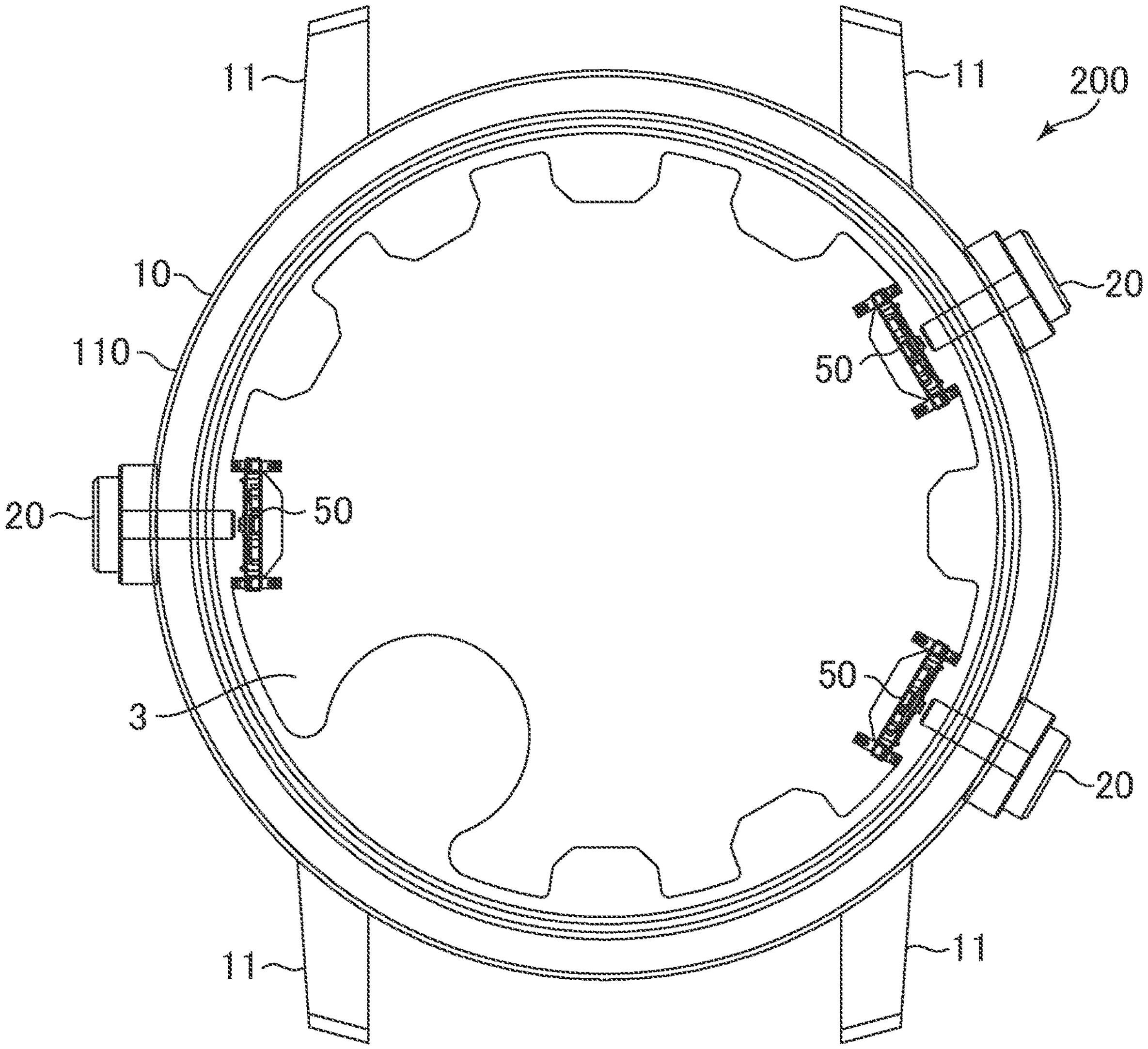
FIG. 14 is a plan view of an electronic time piece according to the first modification of the present embodiment.

FIG. 14 is a plan view of an electronic time piece according to the first modification of the present embodiment. FIG. 15 is a plan view of a circuit block of the first modification of the present embodiment. In FIG. 14, the dial 14 and the main plate 2 are omitted. That is, FIG. 14 shows the circuit block 3 visually recognized through the wind shield. In FIG. 14, the time hand and the sub dial are also omitted. The same reference numerals will be used for the same configurations as those described with reference to FIGS. 1 to 13C, and a detailed description thereof will be omitted.

As shown in FIG. 14, the push buttons 20 are disposed near the positions of 9 o'clock, 2 o'clock, and 4 o'clock in the electronic time piece 200 according to the first modification. That is, in the main plate 2, the switch members 50 are mounted on the mounting portions 21 formed at the positions corresponding to the positions of 9 o'clock, 2 o'clock, and 4 o'clock.

Figure 15:
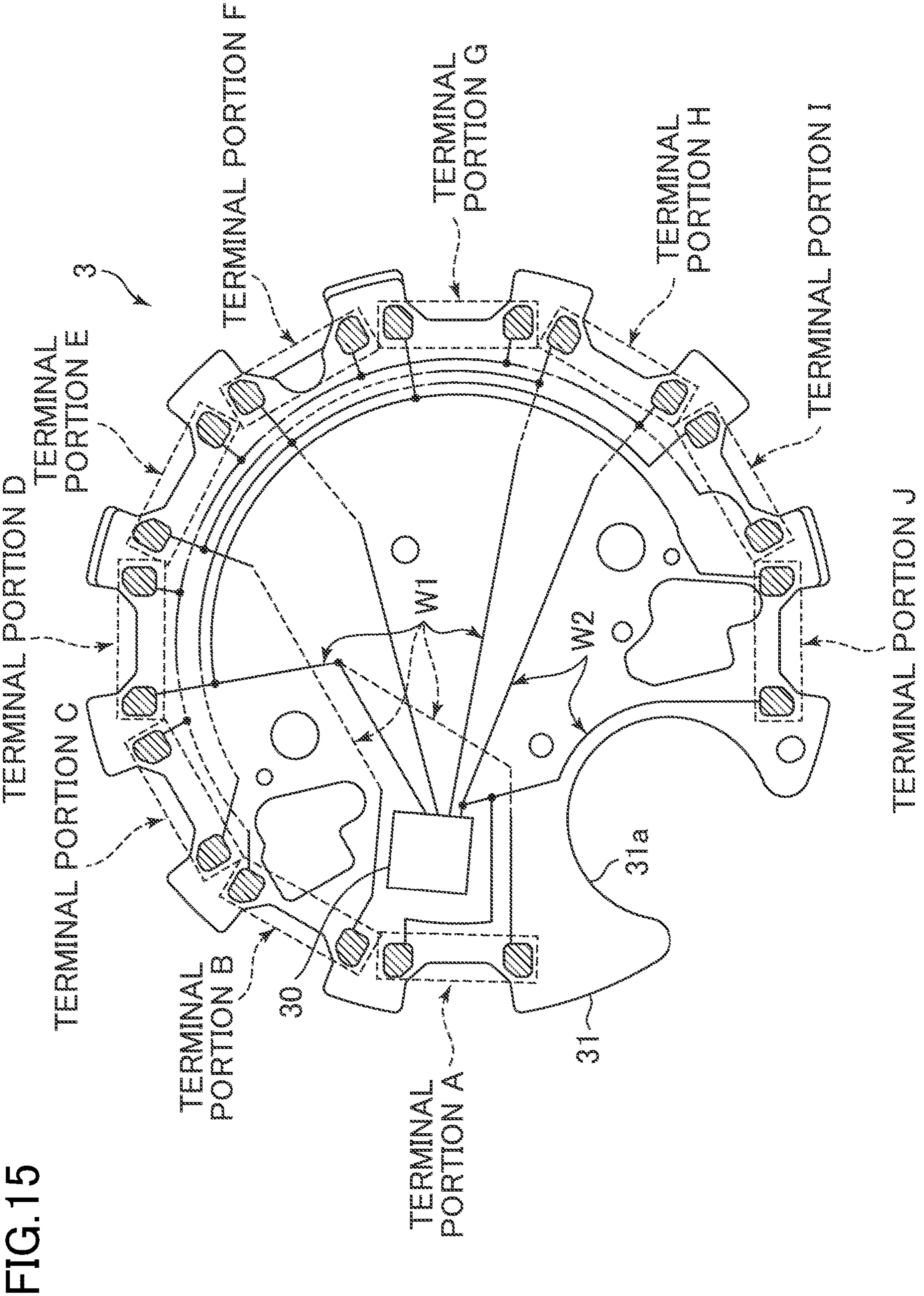
FIG. 15 is a plan view of a circuit block of the first modification of the present embodiment.

In the first modification, as shown in FIG. 15, the circuit block 3 is configured such that the wiring pattern including the terminal portions A to J and the control circuit 30 electrically connected to the terminal portions A to J via the wiring pattern are mounted on the substrate 31.

In the first modification as well, the wires that connect the terminal portions corresponding to the mounting portions 21 that are not used at the same time due to the layout of the push buttons 20 with the control circuit 30 share a common part. For example, the terminal portion A and the terminal portion D are not used at the same time, and thus the wires share a common part.

In the example shown in FIG. 15, the terminal portions A, F, and H are used. As another example, the configuration of the first modification enables the terminal portions B, G, and I to be used, and the terminal portions C, H, and J to be used. That is, in the first modification, three types of variations can be achieved using the movement 1 in common. Further, with the use of the adjacent terminal portions (e.g., terminal portions A, B, C), eight variations can be achieved. That is, the total of eleven types of variations can be achieved.

In the first modification described above as well, it is not necessary to manufacture the movement 1 separately when manufacturing electronic time pieces 200 having the fixed layout of push buttons 20 and different appearances. In other words, electronic time pieces 200 having different appearances can be manufactured using the common movement 1 only by adjusting the disposing angle of the movement 1 to the outer case 10. Further, a part of the wires W is used in common, which serves to reduce the number of wires and prevent the wiring pattern from being complicated. As a result, it is possible to prevent the circuit from increasing in size.

Figure 16:
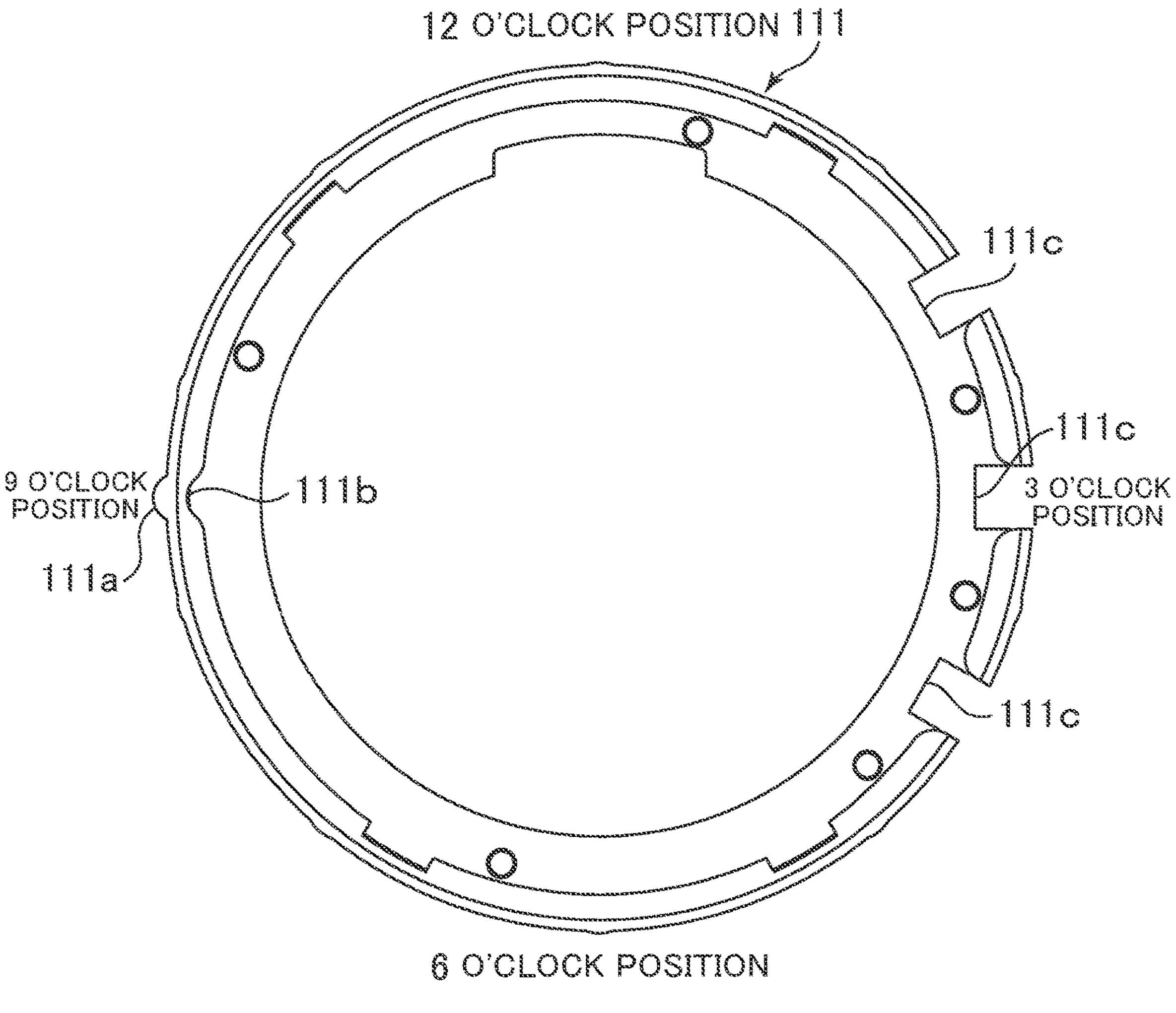
FIG. 16 is a plan view of a casing frame of the second modification of the present embodiment.

Next, referring to FIG. 16, a second modification of the present embodiment will be described. FIG. 16 is a plan view of a casing frame of the second modification of the present embodiment. In the present embodiment, the movement 1 is accommodated in the case body 110 of the outer case 10, and the movement 1 is positioned with respect to the case body 110. However, the present invention is not limited to this, and the outer case 10 may have a casing frame 111 as an intermediate member on the inside of the case body 110.

The outer case 10 has the casing frame 111, and thus the movement 1 can be incorporated into the outer case 10 having a large diameter.

The shape of the case body 110 is the same as that shown in the embodiment, and the case body 110 may have a concave portion 15 on the inner surface. The casing frame 111 has a convex portion 111*a* on the outer periphery. When the convex portion 111*a* is fitted into the concave portion 15, the disposing angle of the casing frame 111 with respect to the case body 110 may be determined. In other words, the convex portion 111*a* and the concave portion 15 may function as a rotation stopper of the casing frame 111 accommodated in the outer case 10.

The shape of the main plate 2 is the same as that shown in the embodiment, and the casing frame 111 may have a concave portion 111*b* on the inner surface. When the convex portion 25 of the main plate 2 is fitted into the concave portion 111*b* of the casing frame 111, the disposing angle of the main plate 2 with respect to the casing frame 111 may be determined. In other words, the convex portion 25 and the concave portion 111*b* may function as a rotation stopper of the main plate 2 (movement 1) accommodated in the casing frame 111.

Further, as shown in FIG. 16, the casing frame 111 may have notches 111*c* on the outer periphery in accordance with the number of push buttons 20. FIG. 16 shows an example of the notches 111*c* formed at three positions. Specifically, FIG. 16 shows the casing frame 111 that is used in a case where the push button 20 in the middle of three push buttons 20 disposed side by side as in the present embodiment is disposed at the position of 3 o'clock. The pressing portion 20*c* of the push button 20 presses the switch 51*a* of the switch member 50 through the notch 111*c*.

Figure 17:
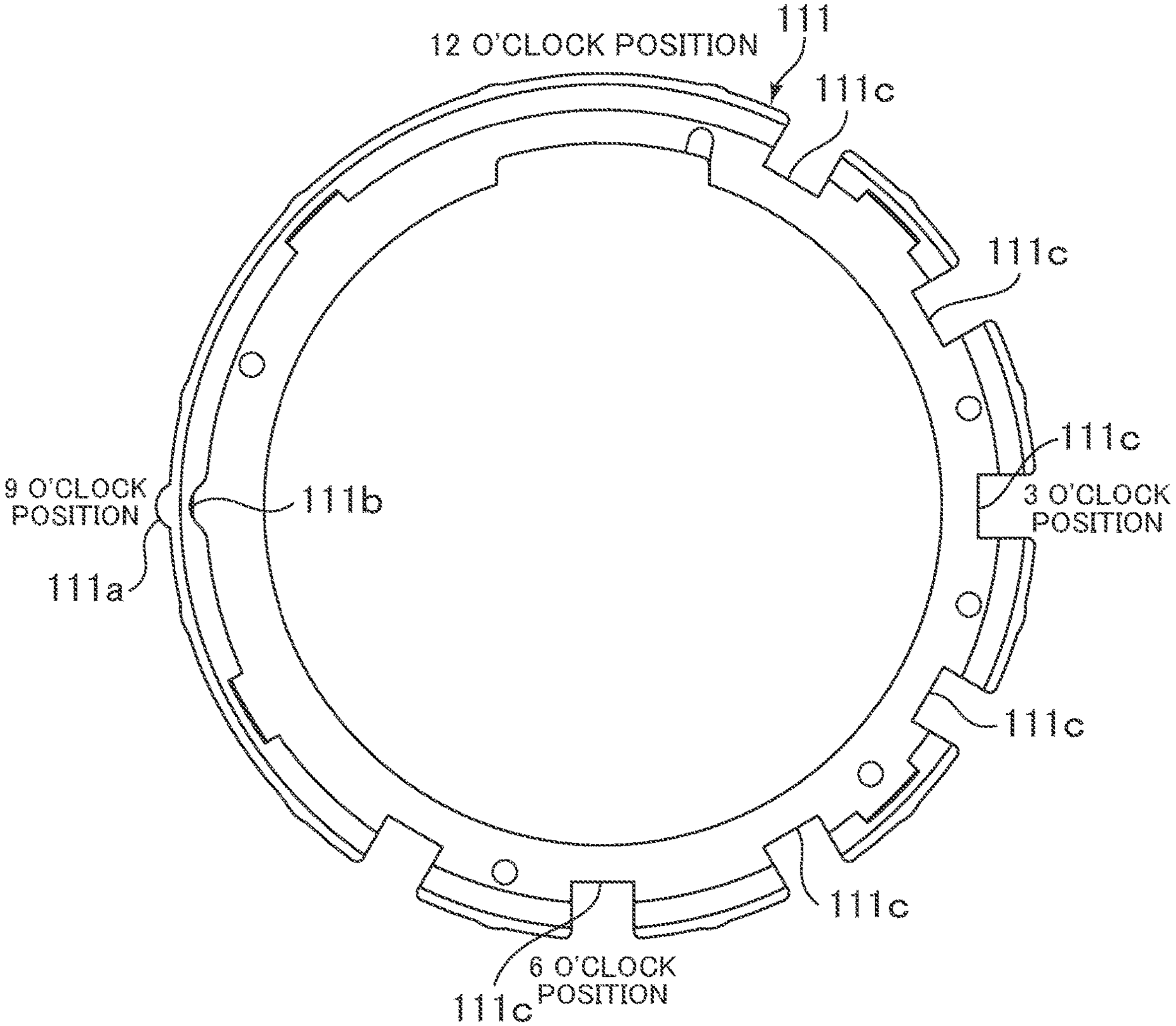
FIG. 17 is a plan view of a casing frame of another example.

Next, referring to FIG. 17, another example of the casing frame 111 will be described. FIG. 17 is a plan view of a casing frame of another example. In FIG. 17, the casing frame 111 has seven notches 111*c* on the outer periphery. In this case, the case body 110 of the outer case 10 may have a number of concave portions 15 corresponding to the number of variations in the appearance of the electronic time piece 1. This enables to use the common case body 110 and change the disposing angle of the casing frame 111 with respect to the case body 110. That is, the case body 110 can be commonly used, and the disposing angle of the movement 1 with respect to the case body 110 can be changed in accordance with the appearance of the electronic time piece 100.

Figure 18:
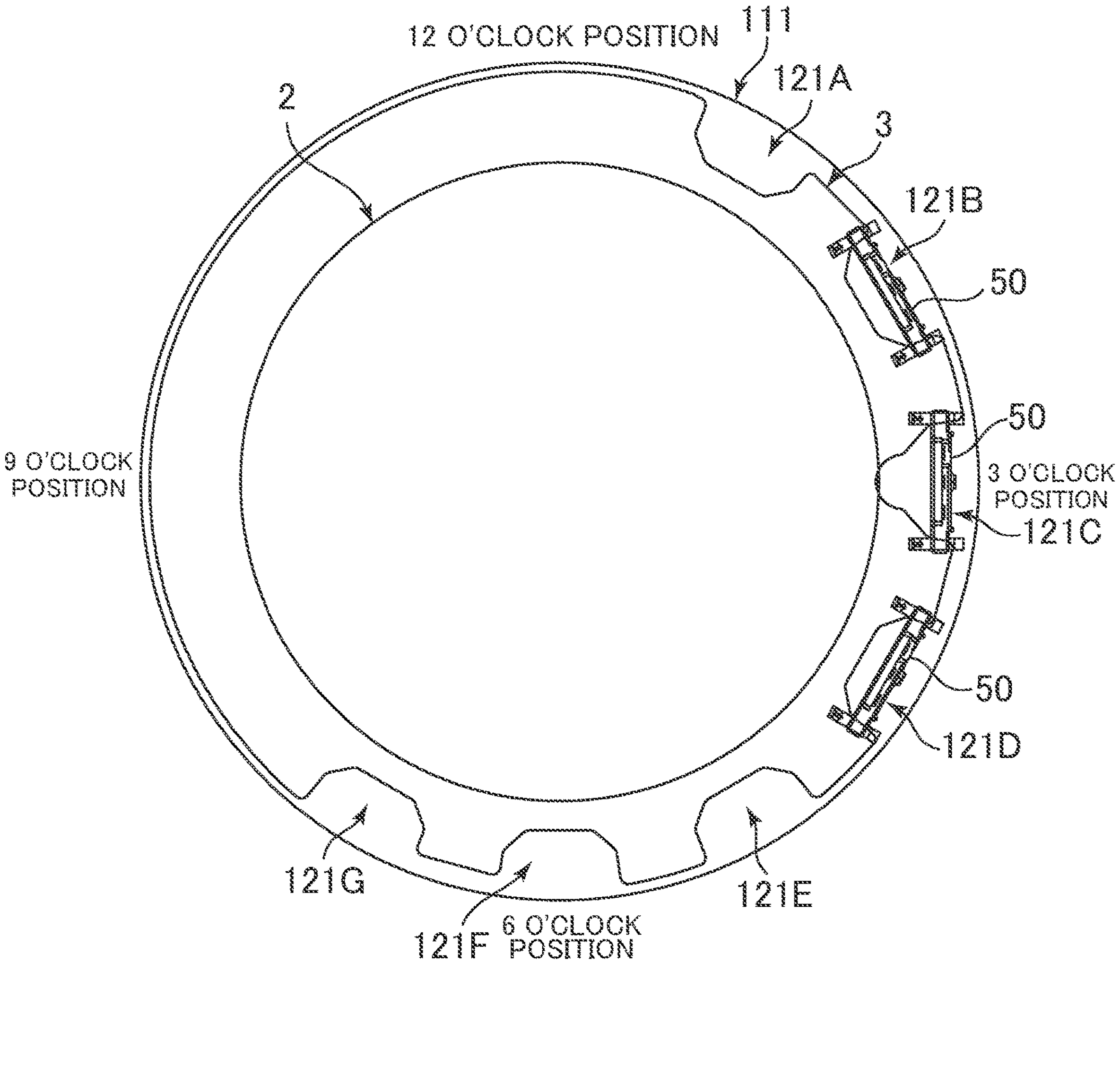
FIG. 18 is a schematic plan view of a casing frame and its periphery according to the third modification of the present embodiment.
Figure 19:
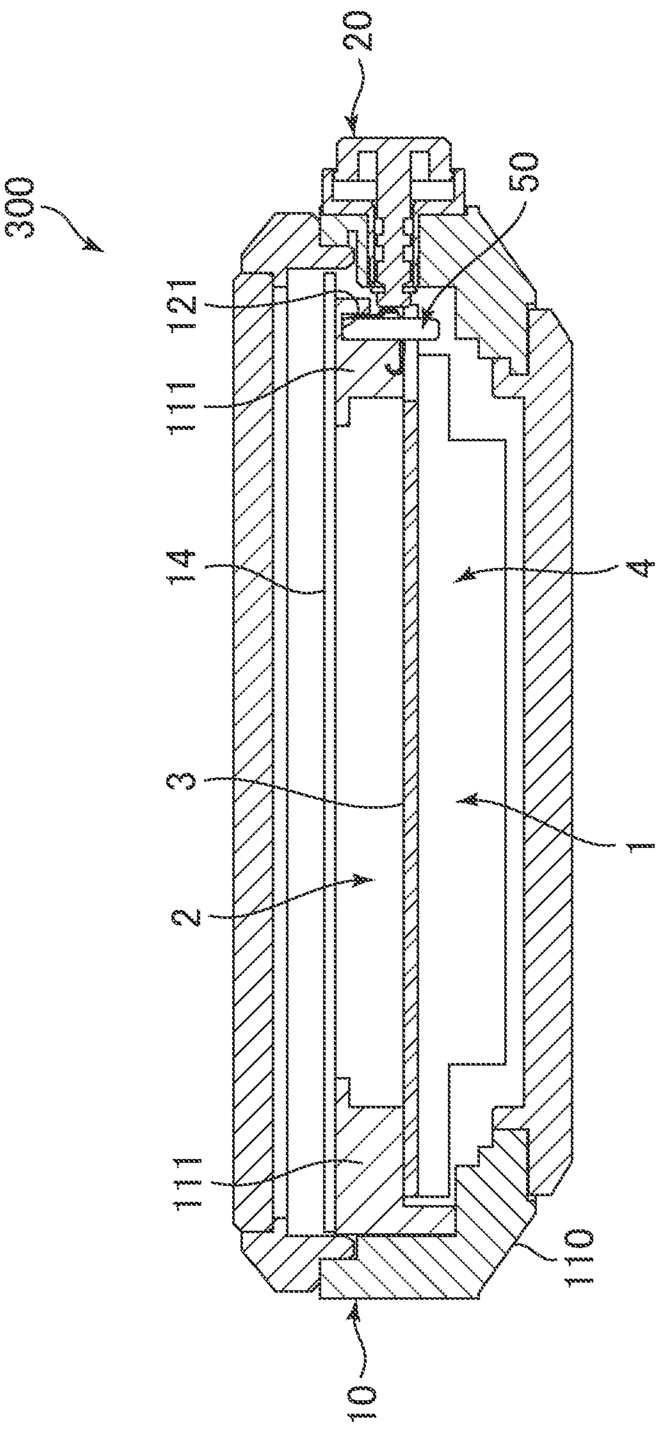
FIG. 19 is a cross-sectional view of an electronic time piece according to the third modification of the present embodiment.

Next, referring to FIGS. 18 and 19, the third modification of the present embodiment will be described. FIG. 18 is a plan view showing a schematic of a configuration of an intermediate frame and its periphery according to a third modification of the present embodiment. FIG. 18 shows only the outer shape of the main plate 2 in a circular solid line. FIG. 19 is a cross-sectional view of an electronic time piece according to the third modification of the present embodiment.

In the third modification, the outer case 10 has a casing frame 111 as in the second modification, and the mounting portions 121 (mounting portion 121A to 121G) are formed in the casing frame 111. That is, in the third modification, the switch members 50 are mounted not on the main plate 2 but on the casing frame 111. The mounting portion 121 of the casing frame 111 may have the same configuration and function as the mounting portion 21 described in the embodiment.

As shown in FIG. 19, a timepiece 300 according to the third modification has an outer case 10 including a case body 110 and a casing frame 111. The casing frame 111 accommodates a main plate 2 (movement 1).

The mounting portions 121A to 121G, to which switch members 50 are mounted, are formed on the outer periphery of the casing frame 111. In the third modification, similarly to the main plate 2 shown in the embodiment, seven mounting portions 121 are formed seven in accordance with the number of terminal portions formed in the circuit block 3. In the third modification, for example, similarly to the main plate 2 shown in the embodiment, the switch members 50 may be mounted on any three of the seven mounting portions 121 adjacent to each other. For example, the casing frame 111 may be housed in the case body 110 such that the mounting portion 21 in the middle of the three mounting portions 21 to which the switch members 50 are mounted is positioned at 3 o'clock.

Figure 20:
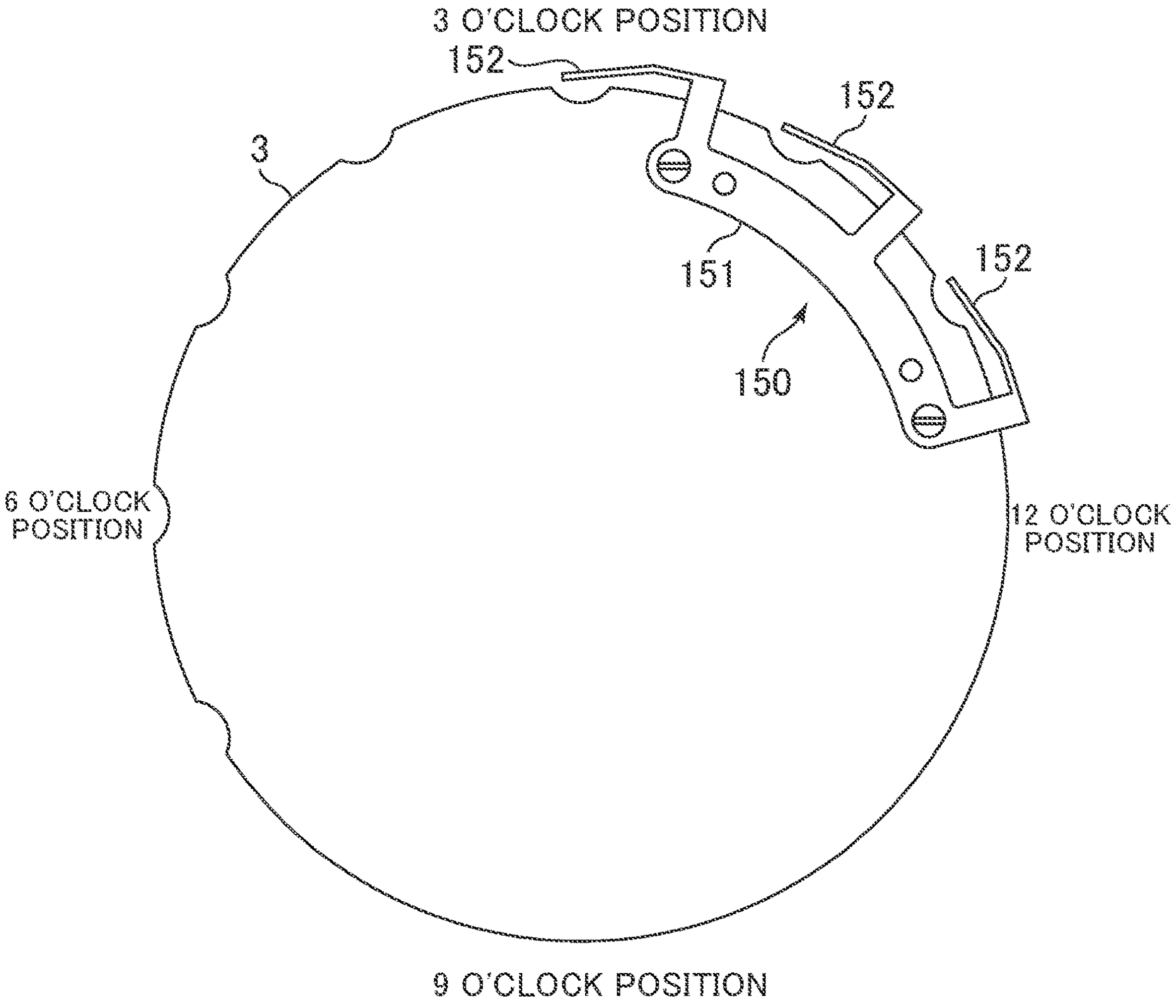
FIG. 20 is a plan view of a circuit block in which a switch spring is assembled in the fourth modification.

Next, referring to FIG. 20, the fourth modification of the present embodiment will be described. FIG. 20 is a plan view of a circuit block to which a switch spring is attached in the fourth modification.

In the embodiment, the three switch members 50 are separately provided, although the present invention is not limited to this, and a plurality of switch members may be physically formed of one member.

The fourth modification includes a switch spring 150 having an arc-shaped disposing portion 151 along the outer edge of the circuit block 3 and three flat springs 152 (switch member) extending from the disposing portion 151. The switch spring 150 is fixed by a fixture such as a screw and may be thereby assembled to the substrate 31 of the movement 1. Although not shown, the circuit block 3 may have a screw hole, which is formed according to the mounting position of the switch spring 150 and to which the fixture is fixed. By changing the mounting position of the disposing portion 151 to the circuit block 3, it is possible to change the position of the flat spring 152 to the terminal portion. FIG. 20 shows an example in which one of the flat springs 152 is at the position of 3 o'clock, and two flat springs 152 are disposed side by side toward the 12 o'clock position.

The flat spring 152 has a function corresponding to the switch member 50 described in the embodiment. That is, when the user presses the button portion 20*a* of the push button 20, the flat spring 152 is pressed by the pressing portion 20*c* and is in contact with the conductive portion on the circuit board. In this state, the wire W for connecting the control circuit 30 with the GND is energized and a switch signal is thereby fed into the control circuit 30. The conductive portion may use a side through hole provided on the side surface of the circuit board, for example. In the fourth modification, there is no need to form the mounting portion 21 on the main plate 2, which serves to simplify the structure.

In the fourth modification, the switch spring 150 is assembled to the circuit block 3, but the present invention is not limited to this example and the switch spring 150 may be assembled to other substrates included in the movement 1.

In the fourth modification, the flat springs 152 being the switch members are physically composed of one member. Similarly, the push buttons 20 are not limited to separate members but may be physically composed of one member. In this case, the push button may have an arc-shape extending across the plurality of mounting portions 21 or the plurality of flat springs 152 in the circumferential direction.

Figure 21:
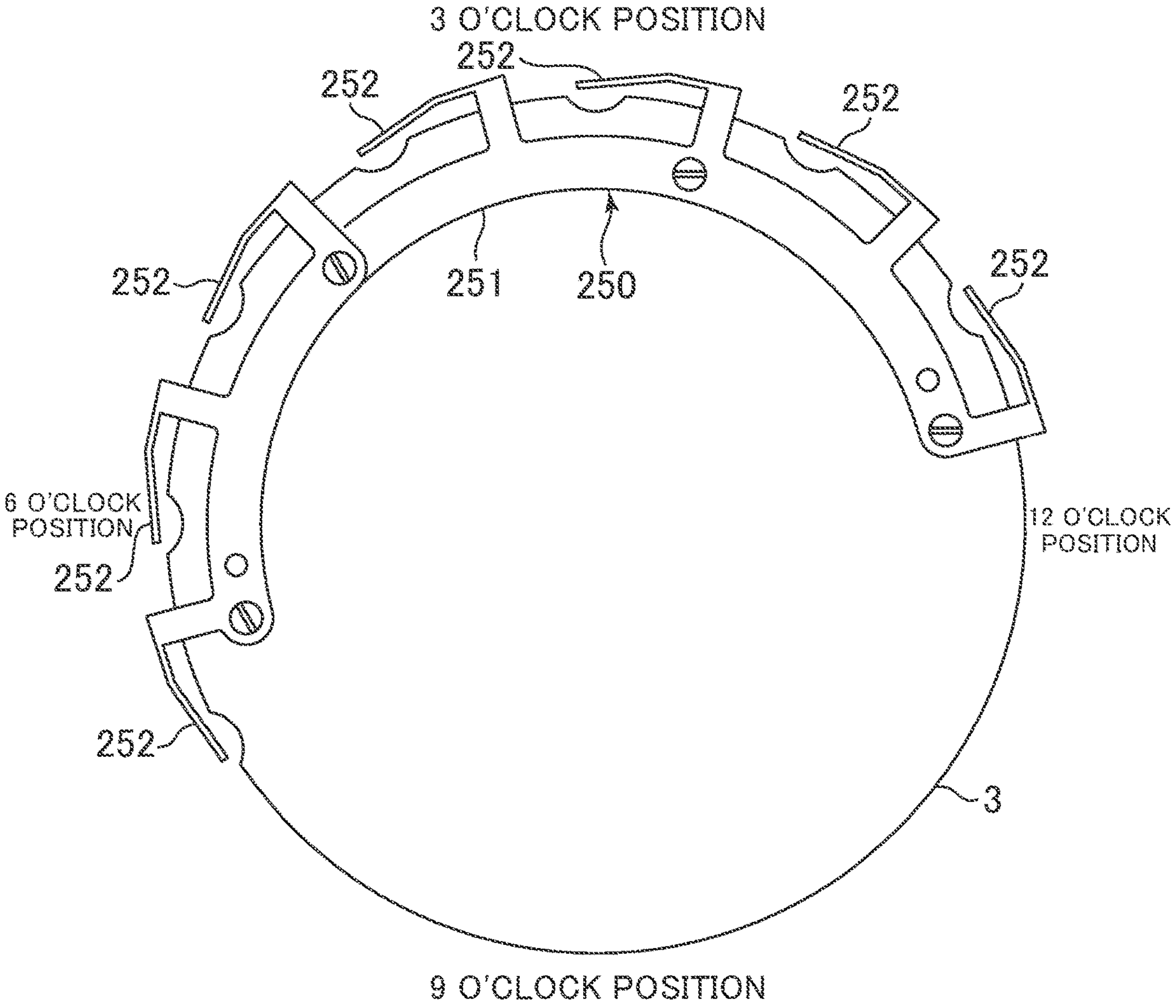
FIG. 21 is a schematic plan view of a circuit block in which a switch spring is assembled in the fifth modification.

Next, referring to FIG. 21, the fifth modification of the present embodiment will be described. FIG. 21 is a plan view of a circuit block to which a switch spring is attached in the fifth modification. In the fifth modification, the switch spring 250 has a plurality of flat springs 252 extending from the disposing portion 251 in accordance with the number of variations in the appearances of the electronic time piece 100. The fifth modification is an example corresponding to the case where the switch members 50 described in the embodiment is mounted on all of the mounting portions 21A to 21G. That is, the flat springs 252 other than the flat springs 252 provided corresponding to the push buttons 20 are not used for executing the functions of the electronic time piece 100.

The wiring pattern shown in FIGS. 7 and 15 may be formed on the circuit block 3 using photolithography or printing techniques, for example. Further, the wiring pattern shown in FIGS. 7 and 15 may be formed by forming a wiring group in a matrix on the circuit block 3 and then partially cutting the wiring group by using technique such as milling or laser cutting, for example.

While the embodiments according to the present invention and its modifications have been described above, the specific configuration shown in the embodiments has been shown as an example, and it is not intended to limit the technical scope of the present invention. A person skilled in the art may appropriately modify those disclosed embodiments, and it is to be understood that the technical scope of the invention disclosed in the present application includes modifications thus made.

What is claimed is:

1. An electronic time piece comprising:
a dial;
a function display unit provided on the dial;
a control circuit that controls operation of the function display unit;
a plurality of terminal portions;
a plurality of wires that electrically connect the plurality of terminal portions with the control circuit;
an operating member that receives operation by a user and switches a state of electrical connection between a first terminal portion of the plurality of terminal portions and the control circuit,
a movement integrally formed of a main plate, a circuit block, and a battery spacer;
wherein the control circuit, the plurality of terminal portions, and the plurality of wires are provided on the movement, wherein
the first terminal portion and a second terminal portion of the plurality of terminal portions are electrically connected with the control circuit through a common wire among plurality of wires,
the movement is configured to be accommodated in an outer case at a plurality of disposing angles according to a shape of the outer case; and
wherein each of the disposing angles indicates an angle of rotation of the movement in reference to the outer case.

2. The electronic time piece according to claim 1, comprising:
a switch member for electrically conducting between the control circuit and the first terminal portion in response to operation of the operating member by the user; and
a disposing portion for disposing the switch member in accordance with a position of the terminal portion.

3. The electronic time piece according to claim 2, wherein the disposing portion is provided according to a number of the plurality of terminal portions.

4. The electronic time piece according to claim 2, wherein the plurality of wires include:
a first wire that electrically connects the control circuit with the terminal portion that is disposed to correspond to the switch member; and
a second wire that electrically connects the control circuit with the terminal portion that is not disposed to correspond to the switch member, wherein
the first wire and the second wire share a common part.

5. The electronic time piece according to claim 2, wherein the disposing portion is a mounting portion on which the switch member is mounted.

6. The electronic time piece according to claim 2, comprising:
at least one of the movement or the outer case includes a positioning portion that positions the movement with respect to the outer case so as to determine a position of the disposing portion.

7. The electronic time piece according to claim 6, wherein there are a first number of positioning portions and a second number of disposing portions; and
wherein the first number of positioning portions is provided according to the second number of the disposing portions.

8. The electronic time piece according to claim 6, wherein the plurality of disposing portions are provided at intervals corresponding to a disposing angle of the movement to the outer case.

9. The electronic time piece according to claim 6, wherein the switch member is a flat spring, and the electronic time piece includes a switch spring that includes the flat spring and the disposing portion that is assembled with a substrate contained in the movement so as to dispose the flat spring according to a position of the terminal portion.

10. The electronic time piece according to claim 2, wherein the operating member includes at least a first operating member and a second operating member, the switch member includes a first switch member corresponding to the first operating member and a second switch member corresponding to the second operating member, the control circuit includes a first input unit in which a switch signal is input in response to operation of the first operating member by the user, a second input unit in which a switch signal is input in response to operation of the second operating member by the user, and a function setting unit that sets functions to be executed in response to the switch signals entered in the first input unit and the second input unit.

11. The electronic time piece according to claim 10, wherein the first switch member and the second switch member are disposed so as to correspond to adjacent terminal portions of the plurality of terminal portions.

12. The electronic time piece according to claim 11, wherein the wire that electrically connects the control circuit with the terminal portion that is disposed so as to correspond to the first switch member and the wire that electrically connects the control circuit with the terminal portion that is disposed so as to correspond to the second switch member, are not common.

13. The electronic time piece according to claim 2, comprising:

an hour hand rotating around a hand shaft; and a vibration motor or a battery that is disposed so as not to overlap an area between the disposing portion and the hand shaft in a plan view.

14. The electronic time piece according to claim 1, wherein the function display unit includes at least a function hand.

15. The electronic time piece according to claim 1, wherein the function display unit includes a display screen for a digital display.

16. The electronic time piece according to claim 1 comprising a hand shaft to which a time hand is attached, wherein the function display unit is disposed such that a center of the function display unit does not overlap the hand shaft.

* * * * *